United States Patent
Bemmel et al.

(10) Patent No.: US 9,041,349 B2
(45) Date of Patent: May 26, 2015

(54) SYSTEM AND METHOD FOR MANAGING LOAD DISTRIBUTION ACROSS A POWER GRID

(75) Inventors: Vincent Bemmel, Dublin, CA (US); Robert Conant, Burlingame, CA (US)

(73) Assignee: Trilliant Networks, Inc., Redwood City, CA (US)

( * ) Notice: Subject to any disclaimer, the term of this patent is extended or adjusted under 35 U.S.C. 154(b) by 464 days.

(21) Appl. No.: 13/414,632

(22) Filed: Mar. 7, 2012

(65) Prior Publication Data
US 2012/0229089 A1 Sep. 13, 2012

Related U.S. Application Data

(60) Provisional application No. 61/450,277, filed on Mar. 8, 2011.

(51) Int. Cl.
*H01M 10/46* (2006.01)
*H02J 7/00* (2006.01)
*B60L 11/18* (2006.01)

(52) U.S. Cl.
CPC ........... *H02J 7/0013* (2013.01); *B60L 11/1844* (2013.01); *Y02T 10/7088* (2013.01); *Y02T 10/7005* (2013.01); *Y02T 90/163* (2013.01); *Y02T 90/14* (2013.01); *Y02T 90/128* (2013.01); *Y02T 10/7055* (2013.01); *Y04S 10/126* (2013.01); *Y02E 60/721* (2013.01)

(58) Field of Classification Search
CPC .................................................... Y02T 90/163
USPC ........... 320/109, 104, 107, 132, 149; 702/61, 702/62, 63, 64, 65
See application file for complete search history.

(56) References Cited

U.S. PATENT DOCUMENTS

| | | | |
|---|---|---|---|
| 4,132,981 A | 1/1979 | White | 340/203 |
| 4,190,800 A | 2/1980 | Kelly, Jr. et al. | 325/37 |
| 4,204,195 A | 5/1980 | Bogacki | 340/151 |
| 4,254,472 A | 3/1981 | Juengel et al. | 364/900 |
| 4,322,842 A | 3/1982 | Martinez | 370/11 |
| 4,396,915 A | 8/1983 | Farnsworth et al. | 340/870.03 |
| 4,425,628 A | 1/1984 | Bedard et al. | 364/900 |
| 4,638,314 A | 1/1987 | Keller | 340/870.02 |

(Continued)

FOREIGN PATENT DOCUMENTS

| | | | | |
|---|---|---|---|---|
| EP | 0 578 041 B1 | 11/1999 | | H04L 12/56 |
| EP | 0 663 746 B1 | 1/2003 | | H04L 12/46 |

(Continued)

OTHER PUBLICATIONS

Hydro One Networks, Inc., Request for Proposal for Smart Metering Services, 16 pp., Mar. 4, 2005.

(Continued)

*Primary Examiner* — Edward Tso
(74) *Attorney, Agent, or Firm* — Moser Taboada

(57) ABSTRACT

A method for scheduling a charge of a plug-in electric vehicle (PEV) includes receiving, by a load management system, PEV information from a PEV plugged into an electric vehicle supply equipment (EVSE); transformer information from a transformer management system, the transformer information relating to a transformer associated with the EVSE; determining, by the charging information based on the PEV information and transformer information; providing the charging information to the PEV.

24 Claims, 5 Drawing Sheets

(56) References Cited

U.S. PATENT DOCUMENTS

| | | | |
|---|---|---|---|
| 4,644,320 A | 2/1987 | Carr et al. | 340/12.37 |
| 4,749,992 A | 6/1988 | Fitzemeyer et al. | 340/870.02 |
| 4,792,946 A | 12/1988 | Mayo | 370/245 |
| 4,939,726 A | 7/1990 | Flammer et al. | 370/400 |
| 5,007,052 A | 4/1991 | Flammer | 370/389 |
| 5,056,107 A | 10/1991 | Johnson et al. | 375/138 |
| 5,077,753 A | 12/1991 | Grau, Jr. et al. | 375/141 |
| 5,079,768 A | 1/1992 | Flammer | 370/349 |
| 5,115,433 A | 5/1992 | Baran et al. | 370/400 |
| 5,117,422 A | 5/1992 | Hauptschein et al. | 370/255 |
| 5,130,987 A | 7/1992 | Flammer | 370/436 |
| 5,138,615 A | 8/1992 | Lamport et al. | 370/94.3 |
| 5,159,592 A | 10/1992 | Perkins | 370/338 |
| 5,216,623 A | 6/1993 | Barrett et al. | 364/550 |
| 5,276,680 A | 1/1994 | Messenger | 370/311 |
| 5,311,581 A | 5/1994 | Merriam et al. | 379/106.07 |
| 5,400,338 A | 3/1995 | Flammer, III et al. | 370/255 |
| 5,430,729 A | 7/1995 | Rahnema | 370/409 |
| 5,432,507 A | 7/1995 | Mussino et al. | 340/870.03 |
| 5,453,977 A | 9/1995 | Flammer, III et al. | 370/254 |
| 5,459,727 A | 10/1995 | Vannucci | 370/332 |
| 5,463,777 A | 10/1995 | Bialkowski et al. | 1/1 |
| 5,465,398 A | 11/1995 | Flammer | 455/69 |
| 5,467,345 A | 11/1995 | Cutter, Jr. et al. | 370/229 |
| 5,471,469 A | 11/1995 | Flammer, III et al. | 370/346 |
| 5,479,400 A | 12/1995 | Dilworth et al. | 370/331 |
| 5,488,608 A | 1/1996 | Flammer, III | 370/400 |
| 5,515,369 A | 5/1996 | Flammer, III et al. | 370/480 |
| 5,515,509 A | 5/1996 | Rom | 709/228 |
| 5,528,507 A | 6/1996 | McNamara et al. | 700/286 |
| 5,544,036 A | 8/1996 | Brown, Jr. et al. | 364/145 |
| 5,553,094 A | 9/1996 | Johnson et al. | 375/130 |
| 5,570,084 A | 10/1996 | Retter et al. | 370/338 |
| 5,572,438 A | 11/1996 | Ehlers et al. | 700/295 |
| 5,572,528 A | 11/1996 | Shuen | 370/402 |
| 5,596,722 A | 1/1997 | Rahnema | 709/241 |
| 5,608,721 A | 3/1997 | Natarajan et al. | 370/238 |
| 5,608,780 A | 3/1997 | Gerszberg et al. | 455/436 |
| 5,623,495 A | 4/1997 | Eng et al. | 370/397 |
| 5,659,300 A | 8/1997 | Dresselhuys et al. | 340/870.02 |
| 5,673,252 A | 9/1997 | Johnson et al. | 370/449 |
| 5,684,710 A | 11/1997 | Ehlers et al. | 700/293 |
| 5,696,501 A | 12/1997 | Ouellette et al. | 340/870.02 |
| 5,696,695 A | 12/1997 | Ehlers et al. | 700/286 |
| 5,717,718 A | 2/1998 | Rowsell et al. | 375/260 |
| 5,719,564 A | 2/1998 | Sears | 340/870.02 |
| 5,726,644 A | 3/1998 | Jednacz et al. | 340/825.52 |
| 5,727,057 A | 3/1998 | Emery et al. | 379/201.07 |
| 5,737,318 A | 4/1998 | Melnik | 370/254 |
| 5,740,366 A | 4/1998 | Mahany et al. | 709/227 |
| 5,748,104 A | 5/1998 | Argyroudis et al. | 340/870.11 |
| 5,757,783 A | 5/1998 | Eng et al. | 370/315 |
| 5,758,331 A | 5/1998 | Johnson | 705/412 |
| 5,761,083 A | 6/1998 | Brown, Jr. et al. | 364/492 |
| 5,767,790 A | 6/1998 | Jovellana | 340/870.02 |
| 5,774,660 A | 6/1998 | Brendel et al. | 709/201 |
| 5,812,531 A | 9/1998 | Cheung et al. | 370/255 |
| 5,822,309 A | 10/1998 | Ayanoglu et al. | 370/315 |
| 5,844,893 A | 12/1998 | Gollnick et al. | 370/329 |
| 5,874,903 A | 2/1999 | Shuey et al. | 340/870.02 |
| 5,880,677 A | 3/1999 | Lestician | 340/825.06 |
| 5,892,758 A | 4/1999 | Argyroudis | 370/335 |
| 5,894,422 A | 4/1999 | Chasek | 364/528.26 |
| 5,896,097 A | 4/1999 | Cardozo | 340/870.03 |
| 5,896,566 A | 4/1999 | Averbuch et al. | 455/419 |
| 5,898,387 A | 4/1999 | Davis et al. | 340/870.02 |
| 5,898,826 A | 4/1999 | Pierce et al. | 714/4 |
| 5,901,067 A | 5/1999 | Kao et al. | 700/11 |
| 5,903,566 A | 5/1999 | Flammer, III | 370/406 |
| 5,914,672 A | 6/1999 | Glorioso et al. | 340/870.02 |
| 5,914,673 A | 6/1999 | Jennings et al. | 340/870.03 |
| 5,919,247 A | 7/1999 | Van Hoff et al. | 709/217 |
| 5,920,697 A | 7/1999 | Masters et al. | 709/219 |
| 5,926,531 A | 7/1999 | Petite | 379/144.04 |
| 5,933,092 A | 8/1999 | Ouellette et al. | 340/870.02 |
| 5,953,371 A | 9/1999 | Rowsell et al. | 375/220 |
| 5,963,146 A | 10/1999 | Johnson et al. | 340/870.01 |
| 5,963,457 A | 10/1999 | Kanoi et al. | 364/528.26 |
| 5,974,236 A | 10/1999 | Sherman | 709/221 |
| 5,986,574 A | 11/1999 | Colton | 340/870.02 |
| 5,987,011 A | 11/1999 | Toh | 370/331 |
| 5,991,806 A | 11/1999 | McHann, Jr. | 709/224 |
| 6,014,089 A | 1/2000 | Tracy et al. | 340/870.02 |
| 6,018,659 A | 1/2000 | Ayyagari et al. | 455/431 |
| 6,026,133 A | 2/2000 | Sokoler | 375/365 |
| 6,028,522 A | 2/2000 | Petite | 340/641 |
| 6,044,062 A | 3/2000 | Brownrigg et al. | 370/238 |
| 6,058,355 A | 5/2000 | Ahmed et al. | 702/62 |
| 6,061,609 A | 5/2000 | Kanoi et al. | 700/291 |
| 6,073,169 A | 6/2000 | Shuey et al. | 709/217 |
| 6,075,777 A | 6/2000 | Agrawal et al. | 370/329 |
| 6,078,785 A | 6/2000 | Bush | 455/7 |
| 6,084,867 A | 7/2000 | Meier | 370/338 |
| 6,088,659 A | 7/2000 | Kelley et al. | 702/62 |
| 6,097,703 A | 8/2000 | Larsen et al. | 370/254 |
| 6,108,699 A | 8/2000 | Moiin | 709/221 |
| 6,118,269 A | 9/2000 | Davis | 324/110 |
| 6,122,603 A | 9/2000 | Budike, Jr. | 702/182 |
| 6,124,806 A | 9/2000 | Cunningham et al. | 340/870.02 |
| 6,134,587 A | 10/2000 | Okanoue | 709/222 |
| 6,137,423 A | 10/2000 | Glorioso et al. | 340/870.02 |
| 6,150,955 A | 11/2000 | Tracy et al. | 340/870.02 |
| 6,169,979 B1 | 1/2001 | Johnson | 705/412 |
| 6,172,616 B1 | 1/2001 | Johnson et al. | 340/870.12 |
| 6,195,018 B1 | 2/2001 | Ragle et al. | 340/870.01 |
| 6,218,953 B1 | 4/2001 | Petite | 340/641 |
| 6,233,327 B1 | 5/2001 | Petite | 379/155 |
| 6,239,722 B1 | 5/2001 | Colten et al. | 340/870.02 |
| 6,240,080 B1 | 5/2001 | Okanoue et al. | 370/338 |
| 6,246,677 B1 | 6/2001 | Nap et al. | 370/346 |
| 6,246,689 B1 | 6/2001 | Shavitt | 370/406 |
| 6,298,053 B1 | 10/2001 | Flammer, III et al. | 370/349 |
| 6,300,881 B1 | 10/2001 | Yee et al. | 340/870.02 |
| 6,304,556 B1 | 10/2001 | Haas | 370/254 |
| 6,311,105 B1 | 10/2001 | Budike, Jr. | 700/291 |
| 6,338,087 B1 | 1/2002 | Okanoue | 709/222 |
| 6,362,745 B1 | 3/2002 | Davis | 340/637 |
| 6,363,057 B1 | 3/2002 | Ardalan et al. | 370/252 |
| 6,366,217 B1 | 4/2002 | Cunningham et al. | 340/870.31 |
| 6,369,719 B1 | 4/2002 | Tracy et al. | 340/870.02 |
| 6,369,769 B1 | 4/2002 | Nap et al. | 343/719 |
| 6,373,399 B1 | 4/2002 | Johnson et al. | 340/870.11 |
| 6,396,839 B1 | 5/2002 | Ardalan et al. | 370/401 |
| 6,400,949 B1 | 6/2002 | Bielefeld et al. | 455/434 |
| 6,407,991 B1 | 6/2002 | Meier | 370/338 |
| 6,415,330 B1 | 7/2002 | Okanoue | 709/245 |
| 6,430,268 B1 | 8/2002 | Petite | 379/39 |
| 6,437,692 B1 | 8/2002 | Petite et al. | 340/540 |
| 6,457,054 B1 | 9/2002 | Bakshi | 709/227 |
| 6,480,497 B1 | 11/2002 | Flammer, III et al. | 370/400 |
| 6,480,505 B1 | 11/2002 | Johansson et al. | 370/449 |
| 6,492,910 B1 | 12/2002 | Ragle et al. | 340/870.02 |
| 6,509,841 B1 | 1/2003 | Colton et al. | 340/870.11 |
| 6,522,974 B2 | 2/2003 | Sitton | 702/17 |
| 6,535,498 B1 | 3/2003 | Larsson et al. | 370/338 |
| 6,538,577 B1 | 3/2003 | Ehrke et al. | 340/870.02 |
| 6,553,355 B1 | 4/2003 | Arnoux et al. | 706/13 |
| 6,556,830 B1 | 4/2003 | Lenzo | 455/450 |
| 6,577,671 B1 | 6/2003 | Vimpari | 375/146 |
| 6,606,708 B1 | 8/2003 | Devine et al. | 726/8 |
| 6,618,578 B1 | 9/2003 | Petite | 455/92 |
| 6,618,772 B1 | 9/2003 | Kao et al. | 710/15 |
| 6,628,764 B1 | 9/2003 | Petite | 379/106.01 |
| 6,633,823 B2 | 10/2003 | Bartone et al. | 702/57 |
| 6,636,894 B1 | 10/2003 | Short et al. | 709/225 |
| 6,650,249 B2 | 11/2003 | Meyer et al. | 340/870.28 |
| 6,653,945 B2 | 11/2003 | Johnson et al. | 340/870.02 |
| 6,657,552 B2 | 12/2003 | Belski et al. | 340/870.02 |
| 6,665,620 B1 | 12/2003 | Burns et al. | 702/62 |
| 6,671,635 B1 | 12/2003 | Forth et al. | 702/61 |
| 6,681,110 B1 | 1/2004 | Crookham et al. | 455/420 |
| 6,681,154 B2 | 1/2004 | Nierlich et al. | 700/286 |
| 6,684,245 B1 | 1/2004 | Shuey et al. | 709/223 |
| 6,687,901 B1 | 2/2004 | Imamatsu | 717/173 |

(56) References Cited

U.S. PATENT DOCUMENTS

| | | | |
|---|---|---|---|
| 6,691,173 B2 | 2/2004 | Morris et al. | 709/249 |
| 6,697,331 B1 | 2/2004 | Riihinen et al. | 370/236 |
| 6,710,721 B1 | 3/2004 | Holowick | 340/870.02 |
| 6,711,166 B1 | 3/2004 | Amir et al. | 370/395.1 |
| 6,711,409 B1 | 3/2004 | Zavgren, Jr. et al. | 455/445 |
| 6,711,512 B2 | 3/2004 | Noh | 702/65 |
| 6,714,787 B2 | 3/2004 | Reed et al. | 455/445 |
| 6,718,137 B1 | 4/2004 | Chin | 398/3 |
| 6,725,281 B1 | 4/2004 | Zintel et al. | 719/318 |
| 6,728,514 B2 | 4/2004 | Bandeira et al. | 455/13.1 |
| 6,747,557 B1 | 6/2004 | Petite et al. | 340/540 |
| 6,747,981 B2 | 6/2004 | Ardalan et al. | 370/401 |
| 6,751,445 B2 | 6/2004 | Kasperkovitz et al. | 455/76 |
| 6,751,455 B1 | 6/2004 | Acampora | 455/414.1 |
| 6,751,672 B1 | 6/2004 | Khalil et al. | 709/230 |
| 6,772,052 B1 | 8/2004 | Amundsen et al. | 700/291 |
| 6,775,258 B1 | 8/2004 | van Valkenburg et al. | 370/338 |
| 6,778,099 B1 | 8/2004 | Mayer et al. | 340/870.02 |
| 6,785,592 B1 | 8/2004 | Smith et al. | 700/291 |
| 6,798,352 B2 | 9/2004 | Holowick | 340/870.02 |
| 6,801,865 B2 | 10/2004 | Gilgenbach et al. | 702/61 |
| 6,826,620 B1 | 11/2004 | Mawhinney et al. | 709/235 |
| 6,829,216 B1 | 12/2004 | Nakata | 370/228 |
| 6,829,347 B1 | 12/2004 | Odiaka | 379/220.01 |
| 6,831,921 B2 | 12/2004 | Higgins | 370/401 |
| 6,836,737 B2 | 12/2004 | Petite et al. | 702/62 |
| 6,839,775 B1 | 1/2005 | Kao et al. | 710/15 |
| 6,842,706 B1 | 1/2005 | Baraty | 702/61 |
| 6,845,091 B2 | 1/2005 | Ogier et al. | 370/338 |
| 6,859,186 B2 | 2/2005 | Lizalek et al. | 343/767 |
| 6,865,185 B1 | 3/2005 | Patel et al. | 370/412 |
| 6,882,635 B2 | 4/2005 | Eitan et al. | 370/338 |
| 6,885,309 B1 | 4/2005 | Van Heteren | 340/870.11 |
| 6,891,838 B1 | 5/2005 | Petite et al. | 370/401 |
| 6,900,738 B2 | 5/2005 | Crichlow | 340/870.02 |
| 6,904,025 B1 | 6/2005 | Madour et al. | 370/328 |
| 6,904,385 B1 | 6/2005 | Budike, Jr. | 702/182 |
| 6,909,705 B1 | 6/2005 | Lee et al. | 370/338 |
| 6,914,533 B2 | 7/2005 | Petite | 340/628 |
| 6,914,893 B2 | 7/2005 | Petite | 370/338 |
| 6,946,972 B2 | 9/2005 | Mueller et al. | 340/870.02 |
| 6,954,814 B1 | 10/2005 | Leach | 710/305 |
| 6,963,285 B2 | 11/2005 | Fischer et al. | 340/635 |
| 6,967,452 B2 | 11/2005 | Aiso et al. | 318/466 |
| 6,970,434 B1 | 11/2005 | Mahany et al. | 370/256 |
| 6,970,771 B1 | 11/2005 | Preiss et al. | 700/286 |
| 6,975,613 B1 | 12/2005 | Johansson | 370/338 |
| 6,980,973 B1 | 12/2005 | Karpenko | 705/412 |
| 6,982,651 B2 | 1/2006 | Fischer | 340/870.02 |
| 6,985,087 B2 | 1/2006 | Soliman | 340/870.02 |
| 6,995,666 B1 | 2/2006 | Luttrell | 340/539.1 |
| 6,999,441 B2 | 2/2006 | Flammer, III et al. | 370/337 |
| 7,009,379 B2 | 3/2006 | Ramirez | 324/142 |
| 7,009,493 B2 | 3/2006 | Howard et al. | 340/7.1 |
| 7,010,363 B2 | 3/2006 | Donnelly et al. | 700/19 |
| 7,016,336 B2 | 3/2006 | Sorensen | 370/351 |
| 7,020,701 B1 | 3/2006 | Gelvin et al. | 709/224 |
| 7,042,368 B2 | 5/2006 | Patterson et al. | 340/870.29 |
| 7,046,682 B2 | 5/2006 | Carpenter et al. | 370/401 |
| 7,053,767 B2 | 5/2006 | Petite et al. | 340/531 |
| 7,053,853 B2 | 5/2006 | Merenda et al. | 343/820 |
| 7,054,271 B2 | 5/2006 | Brownrigg et al. | 370/238 |
| 7,062,361 B1 | 6/2006 | Lane | 700/295 |
| 7,064,679 B2 | 6/2006 | Ehrke et al. | 340/870.02 |
| 7,072,945 B1 | 7/2006 | Nieminen et al. | 709/217 |
| 7,079,810 B2 | 7/2006 | Petite et al. | 455/41.2 |
| 7,089,089 B2 | 8/2006 | Cumming et al. | 700/295 |
| 7,102,533 B2 | 9/2006 | Kim | 340/870.02 |
| 7,103,086 B2 | 9/2006 | Steed et al. | 375/132 |
| 7,103,511 B2 | 9/2006 | Petite | 702/188 |
| 7,106,044 B1 | 9/2006 | Lee, Jr. et al. | 324/110 |
| 7,119,713 B2 | 10/2006 | Shuey et al. | 340/870.02 |
| 7,126,494 B2 | 10/2006 | Ardalan et al. | 340/870.02 |
| 7,135,850 B2 | 11/2006 | Ramirez | 324/142 |
| 7,135,956 B2 | 11/2006 | Bartone et al. | 340/3.9 |
| 7,137,550 B1 | 11/2006 | Petite | 235/379 |
| 7,143,204 B1 | 11/2006 | Kao et al. | 710/18 |
| 7,145,474 B2 | 12/2006 | Shuey et al. | 340/870.03 |
| 7,170,425 B2 | 1/2007 | Christopher et al. | 340/870.02 |
| 7,174,260 B2 | 2/2007 | Tuff et al. | 702/61 |
| 7,185,131 B2 | 2/2007 | Leach | 710/305 |
| 7,188,003 B2 | 3/2007 | Ransom et al. | 700/286 |
| 7,197,046 B1 | 3/2007 | Hariharasubrahmanian | 370/466 |
| 7,200,633 B2 | 4/2007 | Sekiguchi et al. | 709/203 |
| 7,209,840 B2 | 4/2007 | Petite et al. | 702/62 |
| 7,215,926 B2 | 5/2007 | Corbett et al. | 455/41.2 |
| 7,222,111 B1 | 5/2007 | Budike, Jr. | 705/412 |
| 7,230,544 B2 | 6/2007 | Van Heteren | 340/870.03 |
| 7,230,931 B2 | 6/2007 | Struhsaker | 370/280 |
| 7,231,482 B2 | 6/2007 | Leach | 710/305 |
| 7,245,938 B2 | 7/2007 | Sobczak et al. | 455/562.1 |
| 7,248,181 B2 | 7/2007 | Patterson et al. | 340/870.3 |
| 7,248,861 B2 | 7/2007 | Lazaridis et al. | 455/414.1 |
| 7,250,874 B2 | 7/2007 | Mueller et al. | 340/870.06 |
| 7,251,570 B2 | 7/2007 | Hancock et al. | 702/57 |
| 7,263,073 B2 | 8/2007 | Petite et al. | 370/278 |
| 7,271,735 B2 | 9/2007 | Rogai | 340/870.02 |
| 7,274,305 B1 | 9/2007 | Luttrell | 340/870.02 |
| 7,274,975 B2 | 9/2007 | Miller | 700/295 |
| 7,277,027 B2 | 10/2007 | Ehrke et al. | 340/870.12 |
| 7,277,967 B2 | 10/2007 | Kao et al. | 710/18 |
| 7,289,887 B2 | 10/2007 | Rodgers | 700/295 |
| 7,295,128 B2 | 11/2007 | Petite | 340/628 |
| 7,301,476 B2 | 11/2007 | Shuey et al. | 340/870.03 |
| 7,304,587 B2 | 12/2007 | Boaz | 340/870.02 |
| 7,308,370 B2 | 12/2007 | Mason, Jr. et al. | 702/65 |
| 7,312,721 B2 | 12/2007 | Mason, Jr. et al. | 340/870.02 |
| 7,315,257 B2 | 1/2008 | Patterson et al. | 340/870.02 |
| 7,317,404 B2 | 1/2008 | Cumeralto et al. | 340/870.02 |
| 7,321,316 B2 | 1/2008 | Hancock et al. | 340/870.02 |
| 7,324,453 B2 | 1/2008 | Wu et al. | 370/238 |
| 7,327,998 B2 | 2/2008 | Kumar et al. | 455/405 |
| 7,346,463 B2 | 3/2008 | Petite et al. | 702/62 |
| 7,348,769 B2 | 3/2008 | Ramirez | 324/158.1 |
| 7,349,766 B2 | 3/2008 | Rodgers | 700/295 |
| 7,362,709 B1 | 4/2008 | Hui et al. | 370/237 |
| 7,366,113 B1 | 4/2008 | Chandra et al. | 370/255 |
| 7,366,191 B2 | 4/2008 | Higashiyama | 370/406 |
| 7,379,981 B2 | 5/2008 | Elliott et al. | 709/220 |
| 7,397,907 B2 | 7/2008 | Petite | 379/155 |
| 7,402,978 B2 * | 7/2008 | Pryor | 320/104 |
| 7,406,298 B2 | 7/2008 | Luglio et al. | 455/90.3 |
| 7,411,964 B2 | 8/2008 | Suemura | 370/400 |
| 7,427,927 B2 | 9/2008 | Borleske et al. | 340/870.02 |
| 6,249,516 B1 | 11/2008 | Brownrigg et al. | 370/338 |
| 7,451,019 B2 | 11/2008 | Rodgers | 700/295 |
| 7,457,273 B2 | 11/2008 | Nakanishi et al. | 370/338 |
| 7,468,661 B2 | 12/2008 | Petite et al. | 340/540 |
| 7,487,282 B2 | 2/2009 | Leach | 710/305 |
| 7,495,578 B2 | 2/2009 | Borleske | 340/870.02 |
| 7,498,873 B2 | 3/2009 | Opshaug et al. | 329/315 |
| 7,505,453 B2 | 3/2009 | Carpenter et al. | 370/352 |
| 7,512,234 B2 | 3/2009 | McDonnell et al. | 380/247 |
| 7,515,571 B2 | 4/2009 | Kwon et al. | 370/338 |
| 7,516,106 B2 | 4/2009 | Ehlers et al. | 705/412 |
| 7,522,540 B1 | 4/2009 | Maufer | 370/254 |
| 7,522,639 B1 | 4/2009 | Katz | 370/503 |
| 7,539,151 B2 | 5/2009 | Demirhan et al. | 370/254 |
| 7,545,285 B2 | 6/2009 | Shuey et al. | 340/870.02 |
| 7,546,595 B1 | 6/2009 | Wickham et al. | 717/168 |
| 7,548,826 B2 | 6/2009 | Witter et al. | 702/115 |
| 7,548,907 B2 | 6/2009 | Wall et al. | 1/1 |
| 7,554,941 B2 | 6/2009 | Ratiu et al. | 370/328 |
| 7,562,024 B2 | 7/2009 | Brooks et al. | 705/1.1 |
| 7,571,865 B2 | 8/2009 | Nicodem et al. | 236/51 |
| 7,586,420 B2 | 9/2009 | Fischer et al. | 340/635 |
| 7,599,665 B2 | 10/2009 | Sinivaara | 455/67.16 |
| 7,602,747 B2 | 10/2009 | Maksymczuk et al. | 370/331 |
| 7,609,673 B2 | 10/2009 | Bergenlid et al. | 370/329 |
| 7,613,147 B2 | 11/2009 | Bergenlid et al. | 370/329 |
| 7,623,043 B2 | 11/2009 | Mizra et al. | 340/870.02 |
| 7,626,967 B2 | 12/2009 | Yarvis et al. | 370/338 |
| 7,650,425 B2 | 1/2010 | Davis et al. | 709/238 |
| 7,676,231 B2 | 3/2010 | Demirhan et al. | 455/452.1 |

(56) References Cited

U.S. PATENT DOCUMENTS

| | | | |
|---|---|---|---|
| 7,680,041 B2 | 3/2010 | Johansen | 370/230 |
| 7,729,496 B2 | 6/2010 | Hacigumus | 380/277 |
| 7,733,224 B2 | 6/2010 | Tran | 340/540 |
| 7,743,224 B2 | 6/2010 | Wang | 711/154 |
| 7,756,538 B2 | 7/2010 | Bonta et al. | 455/517 |
| 7,788,491 B1 | 8/2010 | Dawson | 713/168 |
| 7,802,245 B2 | 9/2010 | Sonnier et al. | 717/171 |
| 7,814,322 B2 | 10/2010 | Gurevich et al. | 713/171 |
| 7,818,758 B2 | 10/2010 | de Bonet et al. | 719/328 |
| 7,847,706 B1 | 12/2010 | Ross et al. | 340/12.52 |
| 8,019,697 B2 * | 9/2011 | Ozog | 705/412 |
| 8,051,415 B2 | 11/2011 | Suzuki | 717/168 |
| 8,324,859 B2 * | 12/2012 | Rossi | 320/109 |
| 2001/0005368 A1 | 6/2001 | Rune | 370/390 |
| 2001/0010032 A1 | 7/2001 | Ehlers et al. | 702/62 |
| 2001/0038342 A1 | 11/2001 | Foote | 340/870.02 |
| 2001/0046879 A1 | 11/2001 | Schramm et al. | 455/525 |
| 2002/0012358 A1 | 1/2002 | Sato | 370/466 |
| 2002/0013679 A1 | 1/2002 | Petite | 702/188 |
| 2002/0031101 A1 | 3/2002 | Petite et al. | 370/310 |
| 2002/0051269 A1 | 5/2002 | Margalit et al. | 398/126 |
| 2002/0066095 A1 | 5/2002 | Yu | 717/173 |
| 2002/0110118 A1 | 8/2002 | Foley | 370/352 |
| 2002/0114303 A1 | 8/2002 | Crosbie et al. | 370/338 |
| 2002/0120569 A1 | 8/2002 | Day | 705/40 |
| 2002/0174354 A1 | 11/2002 | Bel et al. | 713/193 |
| 2002/0186619 A1 | 12/2002 | Reeves et al. | 368/47 |
| 2003/0001640 A1 | 1/2003 | Lao et al. | 327/165 |
| 2003/0001754 A1 | 1/2003 | Johnson et al. | 340/870.02 |
| 2003/0014633 A1 | 1/2003 | Gruber | 713/170 |
| 2003/0033394 A1 | 2/2003 | Stine | 709/222 |
| 2003/0037268 A1 | 2/2003 | Kistler | 713/310 |
| 2003/0050737 A1 | 3/2003 | Osann | 700/276 |
| 2003/0112822 A1 | 6/2003 | Hong et al. | 370/469 |
| 2003/0117966 A1 | 6/2003 | Chen | 370/255 |
| 2003/0122686 A1 | 7/2003 | Ehrke et al. | 340/870.02 |
| 2003/0123481 A1 | 7/2003 | Neale et al. | 370/466 |
| 2003/0156715 A1 | 8/2003 | Reeds, III et al. | 380/37 |
| 2003/0207697 A1 | 11/2003 | Shpak | 455/524 |
| 2003/0229900 A1 | 12/2003 | Reisman | 725/87 |
| 2003/0233201 A1 | 12/2003 | Horst et al. | 702/62 |
| 2004/0008663 A1 | 1/2004 | Srikrishna et al. | 370/351 |
| 2004/0031030 A1 | 2/2004 | Kidder et al. | 717/172 |
| 2004/0034773 A1 | 2/2004 | Balabine et al. | 713/168 |
| 2004/0039817 A1 | 2/2004 | Lee et al. | 709/225 |
| 2004/0056775 A1 | 3/2004 | Crookham et al. | 340/825 |
| 2004/0066310 A1 | 4/2004 | Ehrke et al. | 340/870.02 |
| 2004/0077341 A1 | 4/2004 | Chandranmenon et al. | |
| 2004/0081086 A1 | 4/2004 | Hippelainen et al. | 370/227 |
| 2004/0082203 A1 | 4/2004 | Logvinov et al. | 439/10 |
| 2004/0100953 A1 | 5/2004 | Chen et al. | 370/389 |
| 2004/0113810 A1 | 6/2004 | Mason, Jr. et al. | 340/870.02 |
| 2004/0117788 A1 | 6/2004 | Karaoguz et al. | 717/177 |
| 2004/0125776 A1 | 7/2004 | Haugli et al. | 370/338 |
| 2004/0138787 A1 | 7/2004 | Ransom et al. | 700/295 |
| 2004/0140908 A1 | 7/2004 | Gladwin et al. | 340/870.02 |
| 2004/0157613 A1 | 8/2004 | Steer et al. | 455/446 |
| 2004/0183687 A1 | 9/2004 | Petite et al. | 340/601 |
| 2004/0185845 A1 | 9/2004 | Abhishek et al. | 455/422.1 |
| 2004/0193329 A1 | 9/2004 | Ransom et al. | 700/286 |
| 2004/0210544 A1 | 10/2004 | Shuey et al. | 705/412 |
| 2004/0268142 A1 | 12/2004 | Karjala et al. | 726/15 |
| 2005/0026569 A1 | 2/2005 | Lim et al. | 455/73 |
| 2005/0027859 A1 | 2/2005 | Alvisi et al. | 709/224 |
| 2005/0030968 A1 | 2/2005 | Rich et al. | 370/449 |
| 2005/0033967 A1 | 2/2005 | Morino et al. | 713/182 |
| 2005/0055432 A1 | 3/2005 | Rodgers | 709/223 |
| 2005/0058144 A1 | 3/2005 | Ayyagari et al. | 370/401 |
| 2005/0065742 A1 | 3/2005 | Rodgers | 702/62 |
| 2005/0122944 A1 | 6/2005 | Kwon et al. | 370/338 |
| 2005/0136972 A1 | 6/2005 | Smith et al. | 455/554.1 |
| 2005/0172024 A1 | 8/2005 | Cheifot et al. | 709/225 |
| 2005/0187928 A1 | 8/2005 | Byers | 1/1 |
| 2005/0193390 A1 | 9/2005 | Suzuki | 717/178 |
| 2005/0195757 A1 | 9/2005 | Kidder et al. | 370/278 |
| 2005/0201397 A1 | 9/2005 | Petite | 370/401 |
| 2005/0228874 A1 | 10/2005 | Edgett et al. | 709/220 |
| 2005/0243867 A1 | 11/2005 | Petite | 370/474 |
| 2005/0249113 A1 | 11/2005 | Kobayashi et al. | 370/219 |
| 2005/0251403 A1 | 11/2005 | Shuey | 705/1 |
| 2005/0257215 A1 | 11/2005 | Denby et al. | 717/172 |
| 2005/0270173 A1 | 12/2005 | Boaz | 340/870.02 |
| 2005/0276243 A1 | 12/2005 | Sugaya et al. | 370/328 |
| 2005/0286440 A1 | 12/2005 | Strutt et al. | 370/253 |
| 2006/0028355 A1 | 2/2006 | Patterson et al. | 340/870.02 |
| 2006/0055432 A1 | 3/2006 | Shimokawa et al. | 327/5 |
| 2006/0056363 A1 | 3/2006 | Ratiu et al. | 370/338 |
| 2006/0056368 A1 | 3/2006 | Ratiu et al. | 370/338 |
| 2006/0077906 A1 | 4/2006 | Maegawa et al. | 370/254 |
| 2006/0087993 A1 | 4/2006 | Sengupta et al. | 370/310 |
| 2006/0098576 A1 | 5/2006 | Brownrigg et al. | 370/238 |
| 2006/0098604 A1 | 5/2006 | Flammer, III et al. | 370/337 |
| 2006/0111111 A1 | 5/2006 | Ovadia | 455/439 |
| 2006/0130053 A1 | 6/2006 | Buljore et al. | 717/173 |
| 2006/0140135 A1 | 6/2006 | Bonta et al. | 370/254 |
| 2006/0146717 A1 | 7/2006 | Conner et al. | 370/238 |
| 2006/0158347 A1 | 7/2006 | Roche et al. | 340/870.02 |
| 2006/0161310 A1 | 7/2006 | Lal | 700/295 |
| 2006/0167784 A1 | 7/2006 | Hoffberg | 705/37 |
| 2006/0184288 A1 | 8/2006 | Rodgers | 700/295 |
| 2006/0215583 A1 | 9/2006 | Castagnoli | 370/254 |
| 2006/0215673 A1 | 9/2006 | Olvera-Hernandez | 370/406 |
| 2006/0217936 A1 | 9/2006 | Mason et al. | 702/188 |
| 2006/0230276 A1 | 10/2006 | Nochta | 713/176 |
| 2006/0271244 A1 | 11/2006 | Cumming et al. | 700/291 |
| 2006/0271678 A1 | 11/2006 | Jessup et al. | 709/224 |
| 2007/0001868 A1 | 1/2007 | Boaz | 340/870.02 |
| 2007/0013547 A1 | 1/2007 | Boaz | 340/870.02 |
| 2007/0019598 A1 | 1/2007 | Prehofer | 370/338 |
| 2007/0036353 A1 | 2/2007 | Reznik et al. | 380/30 |
| 2007/0057767 A1 | 3/2007 | Sun et al. | 340/7.35 |
| 2007/0060147 A1 | 3/2007 | Shin et al. | 455/445 |
| 2007/0063866 A1 | 3/2007 | Webb | 340/870.02 |
| 2007/0063868 A1 | 3/2007 | Borleske | 340/870.03 |
| 2007/0085700 A1 | 4/2007 | Walters et al. | 340/870.02 |
| 2007/0087756 A1 | 4/2007 | Hoffberg | 455/450 |
| 2007/0089110 A1 | 4/2007 | Li | 717/178 |
| 2007/0101442 A1 | 5/2007 | Bondurant | 726/34 |
| 2007/0103324 A1 | 5/2007 | Kosuge et al. | 340/618 |
| 2007/0109121 A1 | 5/2007 | Cohen | 340/539.26 |
| 2007/0110024 A1 | 5/2007 | Meier | 370/351 |
| 2007/0120705 A1 | 5/2007 | Kiiskila et al. | 340/870.02 |
| 2007/0136817 A1 | 6/2007 | Nguyen | 726/26 |
| 2007/0139220 A1 | 6/2007 | Mirza et al. | 340/870.02 |
| 2007/0143046 A1 | 6/2007 | Budike, Jr. | 702/62 |
| 2007/0147268 A1 | 6/2007 | Kelley et al. | 370/254 |
| 2007/0169074 A1 | 7/2007 | Koo et al. | 717/168 |
| 2007/0169075 A1 | 7/2007 | Lill et al. | 717/168 |
| 2007/0169080 A1 | 7/2007 | Friedman | 717/168 |
| 2007/0174467 A1 | 7/2007 | Ballou, Jr. et al. | 709/227 |
| 2007/0177538 A1 | 8/2007 | Christensen et al. | 370/328 |
| 2007/0177576 A1 | 8/2007 | Johansen et al. | 370/351 |
| 2007/0177613 A1 | 8/2007 | Shorty et al. | 370/401 |
| 2007/0189249 A1 | 8/2007 | Gurevich et al. | 370/338 |
| 2007/0200729 A1 | 8/2007 | Borleske et al. | 340/870.02 |
| 2007/0201504 A1 | 8/2007 | Christensen et al. | 370/437 |
| 2007/0204009 A1 | 8/2007 | Shorty et al. | 709/218 |
| 2007/0205915 A1 | 9/2007 | Shuey et al. | 340/870.02 |
| 2007/0206503 A1 | 9/2007 | Gong et al. | 370/238 |
| 2007/0206521 A1 | 9/2007 | Osaje | 370/315 |
| 2007/0207811 A1 | 9/2007 | Das et al. | 455/450 |
| 2007/0210933 A1 | 9/2007 | Leach | 340/870.02 |
| 2007/0211636 A1 | 9/2007 | Bellur et al. | 370/238 |
| 2007/0239477 A1 | 10/2007 | Budike, Jr. | 705/412 |
| 2007/0248047 A1 | 10/2007 | Shorty et al. | 370/329 |
| 2007/0257813 A1 | 11/2007 | Vaswani et al. | 340/870.02 |
| 2007/0258508 A1 | 11/2007 | Werb et al. | 375/140 |
| 2007/0263647 A1 | 11/2007 | Shorty et al. | 370/406 |
| 2007/0265947 A1 | 11/2007 | Schimpf et al. | 705/35 |
| 2007/0266429 A1 | 11/2007 | Ginter et al. | 726/12 |
| 2007/0271006 A1 | 11/2007 | Golden et al. | 700/295 |
| 2007/0276547 A1 | 11/2007 | Miller | 700/295 |
| 2008/0011864 A1 | 1/2008 | Tessier et al. | 236/51 |
| 2008/0018492 A1 | 1/2008 | Ehrke et al. | 340/870.03 |

(56) References Cited

U.S. PATENT DOCUMENTS

| | | | |
|---|---|---|---|
| 2008/0024320 A1 | 1/2008 | Ehrke et al. | 340/870.02 |
| 2008/0031145 A1 | 2/2008 | Ethier et al. | 370/248 |
| 2008/0032703 A1 | 2/2008 | Krumm et al. | 455/456.1 |
| 2008/0037569 A1 | 2/2008 | Werb et al. | 370/406 |
| 2008/0042874 A1 | 2/2008 | Rogai | 340/870.03 |
| 2008/0046388 A1 | 2/2008 | Budike, Jr. | 705/412 |
| 2008/0048883 A1 | 2/2008 | Boaz | 340/870.02 |
| 2008/0051036 A1 | 2/2008 | Vaswani et al. | 455/69 |
| 2008/0063205 A1 | 3/2008 | Braskich et al. | 380/270 |
| 2008/0068217 A1 | 3/2008 | Van Wyk et al. | 340/870.11 |
| 2008/0068994 A1 | 3/2008 | Garrison et al. | 370/230 |
| 2008/0068996 A1 | 3/2008 | Clave et al. | 370/230.1 |
| 2008/0086560 A1 | 4/2008 | Monier et al. | 709/224 |
| 2008/0089314 A1 | 4/2008 | Meyer et al. | 370/349 |
| 2008/0095221 A1 | 4/2008 | Picard | 375/224 |
| 2008/0097782 A1 | 4/2008 | Budike, Jr. | 705/1.1 |
| 2008/0107034 A1 | 5/2008 | Jetcheva et al. | 370/238 |
| 2008/0117110 A1 | 5/2008 | Luglio et al. | 343/702 |
| 2008/0129538 A1 | 6/2008 | Vaswani et al. | 340/870.03 |
| 2008/0130535 A1 | 6/2008 | Shorty et al. | 370/310 |
| 2008/0130562 A1 | 6/2008 | Shorty et al. | 370/329 |
| 2008/0132185 A1 | 6/2008 | Elliott et al. | 455/115.4 |
| 2008/0136667 A1 | 6/2008 | Vaswani et al. | 340/870.02 |
| 2008/0151795 A1 | 6/2008 | Shorty et al. | 370/310 |
| 2008/0151824 A1 | 6/2008 | Shorty et al. | 370/329 |
| 2008/0151825 A1 | 6/2008 | Shorty et al. | 370/329 |
| 2008/0151826 A1 | 6/2008 | Shorty et al. | 370/329 |
| 2008/0151827 A1 | 6/2008 | Shorty et al. | 370/329 |
| 2008/0154396 A1 | 6/2008 | Shorty et al. | 700/90 |
| 2008/0159213 A1 | 7/2008 | Shorty et al. | 370/329 |
| 2008/0165712 A1 | 7/2008 | Shorty et al. | 370/310 |
| 2008/0170511 A1 | 7/2008 | Shorty et al. | 370/254 |
| 2008/0177678 A1 | 7/2008 | Di Martini et al. | 705/512 |
| 2008/0180274 A1 | 7/2008 | Cumeralto et al. | 340/870.02 |
| 2008/0181133 A1 | 7/2008 | Thubert et al. | 370/255 |
| 2008/0183339 A1 | 7/2008 | Vaswani et al. | 700/297 |
| 2008/0186202 A1 | 8/2008 | Vaswani et al. | 340/870.03 |
| 2008/0186203 A1 | 8/2008 | Vaswani et al. | 340/870.11 |
| 2008/0187001 A1 | 8/2008 | Vaswani et al. | 370/466 |
| 2008/0187116 A1 | 8/2008 | Reeves et al. | 379/106.09 |
| 2008/0189415 A1 | 8/2008 | Vaswani et al. | 709/226 |
| 2008/0189436 A1 | 8/2008 | Vaswani et al. | 709/242 |
| 2008/0204272 A1 | 8/2008 | Ehrke et al. | 340/870.02 |
| 2008/0205355 A1 | 8/2008 | Liu et al. | 370/338 |
| 2008/0224891 A1 | 9/2008 | Ehrke et al. | 340/870.02 |
| 2008/0225737 A1 | 9/2008 | Gong et al. | 370/252 |
| 2008/0238714 A1 | 10/2008 | Ehrke et al. | 340/870.02 |
| 2008/0238716 A1 | 10/2008 | Ehrke et al. | 340/870.03 |
| 2008/0272934 A1 | 11/2008 | Wang et al. | 340/870.11 |
| 2008/0283620 A1 | 11/2008 | Knapp | 236/12.16 |
| 2008/0310311 A1 | 12/2008 | Flammer et al. | 370/238 |
| 2008/0310377 A1 | 12/2008 | Flammer et al. | 370/338 |
| 2008/0317047 A1 | 12/2008 | Zeng et al. | 370/401 |
| 2008/0318547 A1 | 12/2008 | Ballou, Jr. et al. | 455/410 |
| 2009/0003214 A1 | 1/2009 | Vaswani et al. | 370/236 |
| 2009/0003232 A1 | 1/2009 | Vaswani et al. | 370/252 |
| 2009/0003243 A1 | 1/2009 | Vaswani et al. | 370/255 |
| 2009/0003356 A1 | 1/2009 | Vaswani et al. | 370/400 |
| 2009/0010178 A1 | 1/2009 | Tekippe | 370/254 |
| 2009/0034418 A1 | 2/2009 | Flammer, III et al. | 370/238 |
| 2009/0034419 A1 | 2/2009 | Flammer, III et al. | 370/238 |
| 2009/0034432 A1 | 2/2009 | Bonta et al. | 370/255 |
| 2009/0043911 A1 | 2/2009 | Flammer et al. | 709/238 |
| 2009/0046732 A1 | 2/2009 | Pratt, Jr. et al. | 370/406 |
| 2009/0055032 A1 | 2/2009 | Rodgers | 700/295 |
| 2009/0068947 A1 | 3/2009 | Petite | 455/462 |
| 2009/0077405 A1 | 3/2009 | Johansen | 713/323 |
| 2009/0079584 A1 | 3/2009 | Grady et al. | 340/870.02 |
| 2009/0082888 A1 | 3/2009 | Johansen | 700/94 |
| 2009/0096605 A1 | 4/2009 | Petite et al. | 340/539.22 |
| 2009/0102737 A1 | 4/2009 | Birnbaum et al. | 343/828 |
| 2009/0115626 A1 | 5/2009 | Vaswani et al. | 340/870.02 |
| 2009/0129575 A1 | 5/2009 | Chakraborty et al. | 379/201.03 |
| 2009/0132220 A1 | 5/2009 | Chakraborty et al. | 703/13 |
| 2009/0134969 A1 | 5/2009 | Veillette | 340/3.1 |
| 2009/0135677 A1 | 5/2009 | Veillette | 368/47 |
| 2009/0135716 A1 | 5/2009 | Veillette | 370/221 |
| 2009/0135843 A1 | 5/2009 | Veillette | 370/406 |
| 2009/0136042 A1 | 5/2009 | Veillette | 380/279 |
| 2009/0138777 A1 | 5/2009 | Veillette | 714/748 |
| 2009/0161594 A1 | 6/2009 | Zhu et al. | 370/312 |
| 2009/0167547 A1 | 7/2009 | Gilbert | 340/662 |
| 2009/0168846 A1 | 7/2009 | Filippo, III et al. | 375/133 |
| 2009/0175238 A1 | 7/2009 | Jetcheva et al. | 370/329 |
| 2009/0179771 A1 | 7/2009 | Seal et al. | 340/870.04 |
| 2009/0200988 A1* | 8/2009 | Bridges et al. | 320/137 |
| 2009/0201936 A1 | 8/2009 | Dumet et al. | 370/401 |
| 2009/0235246 A1 | 9/2009 | Seal et al. | 717/173 |
| 2009/0243840 A1 | 10/2009 | Petite et al. | 340/539.1 |
| 2009/0245270 A1 | 10/2009 | van Greunen et al. | 370/410 |
| 2009/0262642 A1 | 10/2009 | van Greunen et al. | 370/216 |
| 2009/0267792 A1 | 10/2009 | Crichlow | 340/870.02 |
| 2009/0285124 A1 | 11/2009 | Aguirre et al. | 370/255 |
| 2009/0303972 A1 | 12/2009 | Flammer, III et al. | 370/338 |
| 2009/0310593 A1 | 12/2009 | Sheynblat et al. | 370/350 |
| 2009/0315699 A1 | 12/2009 | Satish et al. | 340/533 |
| 2009/0319672 A1 | 12/2009 | Reisman | 709/227 |
| 2009/0320073 A1 | 12/2009 | Reisman | 725/51 |
| 2010/0017249 A1 | 1/2010 | Fincham et al. | 705/412 |
| 2010/0037069 A1 | 2/2010 | Deierling et al. | 713/193 |
| 2010/0037293 A1 | 2/2010 | St. Johns et al. | 726/2 |
| 2010/0040042 A1 | 2/2010 | van Greunen et al. | 370/350 |
| 2010/0060259 A1 | 3/2010 | Vaswani et al. | 324/86 |
| 2010/0061272 A1 | 3/2010 | Veillette | 370/254 |
| 2010/0061350 A1 | 3/2010 | Flammer, III | 370/338 |
| 2010/0073193 A1 | 3/2010 | Flammer, III | 340/870.11 |
| 2010/0074176 A1 | 3/2010 | Flammer, III et al. | 370/328 |
| 2010/0074304 A1 | 3/2010 | Flammer, III | 375/134 |
| 2010/0138660 A1 | 6/2010 | Haynes et al. | 713/171 |
| 2010/0238917 A1 | 9/2010 | Silverman et al. | 370/350 |
| 2010/0256830 A1 | 10/2010 | Kressner et al. | 700/291 |
| 2011/0004358 A1* | 1/2011 | Pollack et al. | 700/297 |
| 2011/0035073 A1* | 2/2011 | Ozog | 700/291 |
| 2011/0066297 A1 | 3/2011 | Saberi et al. | 700/287 |
| 2011/0109266 A1* | 5/2011 | Rossi | 320/109 |

FOREIGN PATENT DOCUMENTS

| | | | |
|---|---|---|---|
| EP | 0 812 502 B1 | 8/2004 | H04L 12/28 |
| EP | 0 740 873 B1 | 12/2005 | H04L 12/44 |
| JP | 10-070774 | 3/1998 | H04Q 5/00 |
| JP | 10-135965 | 5/1998 | H04L 12/28 |
| WO | WO 95/12942 | 5/1995 | H04L 12/44 |
| WO | WO 96/10307 | 4/1996 | H04L 12/28 |
| WO | WO 96/10307 A1 | 4/1996 | H04L 12/28 |
| WO | WO 00/54237 | 9/2000 | G08B 23/00 |
| WO | WO 01/26334 A2 | 4/2001 | H04L 29/06 |
| WO | WO 01/55865 A1 | 8/2001 | G06F 13/00 |
| WO | WO 03/015452 | 2/2003 | H04Q 9/00 |
| WO | WO 2005/091303 | 9/2005 | G06F 9/445 |
| WO | WO 2006/059195 | 6/2006 | G05D 3/12 |
| WO | WO 2007/015822 | 8/2007 | H04L 12/28 |
| WO | WO 2007/132473 | 11/2007 | G08C 17/00 |
| WO | WO 2008/027457 | 3/2008 | G08B 23/00 |
| WO | WO 2008/033287 A2 | 3/2008 | G08B 23/00 |
| WO | WO 2008/033514 A2 | 3/2008 | G08B 25/00 |
| WO | WO 2008/038072 | 4/2008 | H04Q 7/24 |
| WO | WO 2008/092268 A1 | 8/2008 | G01D 7/06 |
| WO | WO 2009/067251 | 5/2009 | G08C 19/00 |

OTHER PUBLICATIONS

Trilliant Networks, "The Trilliant AMI Solution," RFP SCP-07003, 50 pp., Mar. 22, 2007.
"ZigBee Smart Energy Profile Specification," ZigBee Profile 0x0109, Revision 14, Document 075356r14, 202 pp., May 29, 2008.
Hubaux, J. P., et al. "Towards Mobile Ad-Hoc WANs: Terminodes," 2000 IEEE, Wireless Communications and Networking Conference, WCNC, vol. 3, pp. 1052-1059, 2000.
Miklos, G., et al., "Performance Aspects of Bluetooth Scatternet Formation," First Annual Workshop on Mobile and Ad Hoc Networking and Computing, MobiHOC 2000, pp. 147-148, 2000.
Eng, K. Y., et al. "BAHAMA: A Broadband Ad-Hoc Wireless ATM

(56) References Cited

OTHER PUBLICATIONS

Local-Area Network," 1995 IEEE International Conference on Communications, ICC '95 Seattle, 'Gateway to Globalization', vol. 2, pp. 1216-1223, Jun. 18-22, 1995.
Lee, David J. Y., "Ricocheting Bluetooth," 2nd International Conference on Microwave and Millimeter Wave Technology Proceedings, ICMMT 2000, pp. 432-435, 2000.
Lilja, Tore, "Mobile Energy Supervision," Twenty-second International Telecommunications Energy Conference, 2000 INTELEC, pp. 707-712, 2000.
Parkka, Juha, et al., "A Wireless Wellness Monitor for Personal Weight Management," Proceedings of the 2000 IEEE EMBS International Conference on Information Technology Applications in Biomedicine, pp. 83-88, 2000.
Broch, J., et al., "Supporting Hierarchy and Heterogeneous Interfaces in Multi-Hop Wireless Ad Hoc Networks," Proceedings of the Fourth International Symposium on Parallel Architectures, Algorithms, and Networks (I-SPAN '99), pp. 370-375 (7 pp. with Abstract), Jun. 23-25, 1999.
Privat, G., "A System-Architecture Viewpoint on Smart Networked Devices," Microelectronic Engineering, vol. 54, No. 1-2, pp. 193-197, Dec. 2000.
Jonsson, U., et al., "MIPMANET-Mobile IP for Mobile Ad Hoc Networks," MobiHOC 2000, First Annual Workshop on Mobile and Ad Hoc Networking and Computing, pp. 75-85 (12 pp. with Abstract), 2000.
Kapoor, R., et al., "Multimedia Support Over Bluetooth Piconets," First Workshop on Wireless Mobile Internet, pp. 50-55, Jul. 2001.
Sung-Yuan, K., "The Embedded Bluetooth CCD Camera," TENCON, Proceedings of the IEEE Region 10 International Conference on Electrical and Electronic Technology, vol. 1, pp. 81-84 (5 pp. with Abstract), Aug. 19-22, 2001.
Lim, A., "Distributed Services for Information Dissemination in Self-Organizing Sensor Networks," Journal of the Franklin Institute, vol. 338, No. 6, pp. 707-727, Sep. 2001.
Meguerdichian, S., et al., "Localized Algorithms in Wireless Ad-Hoc Networks: Location Discovery and Sensor Exposure," ACM Symposium on Mobile Ad Hoc Networking & Computing, MobiHOC 2001, pp. 106-116, Oct. 2001.
Lilakiatsakun, W., et al. "Wireless Home Networks Based on a Hierarchical Bluetooth Scatternet Architecture," Proceedings of the Ninth IEEE International Conference on Networks, pp. 481-485 (6 pp. with Abstract), Oct. 2001.
Jha, S., et al., "Universal Network of Small Wireless Operators (UNSWo)," Proceedings of the First IEEE/ACM International Symposium on Cluster Computing and the Grid, pp. 626-631 (7 pp. with Abstract), 2001.
"AMRON Technologies Successfully Deploys Advanced Metering Solution for C&I Customers Using Bluetooth" [online], Sep. 2, 2004 [retrieved on Jan. 2, 2009], 3 pp., Retrieved from the Internet: http://www.techweb.com/showpressrelease?articleId-X234101&CompanyId=3.
Utility Intelligence, "Exclusive Distributors of Dynamic Virtual Metering" [online], Copyright 2004-2005 [retrieved on May 12, 2005], Retrieved from the Internet: http://www.empoweringutilities.com/hardware.html, 29 pp.
"AMRON Meter Management System" [online], [retrieved on May 12, 2005], 41 pp., Retrieved from the Internet: http://www.amronm5.com/products/.
Reexamination U.S. Appl. No. 90/008,011, filed Jul. 24, 2006, 75 pp.
Broch, Josh, et al., "A Performance Comparison of Multi-Hop Wireless Ad Hoc Network Routing Protocols," *Proceedings of the Fourth Annual ACM/IEEE International Conference in Mobile Computing and Networking (MobiCom '98)*, Dallas, Texas, 13 pp., Oct. 25-30, 1998.
Broch, Josh, et al., "The Dynamic Source Routing Protocol for Mobile Ad Hoc Networks" [online], Mar. 13, 1998 [retrieved on Feb. 24, 2009], 31 pp., Retrieved from the Internet: http://tools.ietf.org/draft-ietf-manet-dsr-00.txt Katz, Randy H. and Brewer, Eric A., "The Case for Wireless Overlay Networks," *Electrical Engineering and Computer Science Department, University of California*, Berkeley, 12 pp., 1996.
Johnson, David B., "Routing in Ad Hoc Networks of Mobile Hosts," *IEEE*, pp. 158-163, 1995.
Nachum Shacham, Edwin B. Brownrigg, & Clifford A. Lynch, *A Packet Radio Network for Library Automation*, 1987 IEEE Military Communications Conference, vol. 2 at 21.3.1, (Oct. 1987). (TN-IP 0004176-82).
Nachum Shacham & Janet D. Tornow, Future Directions in Packet Radio Technology, Proc. of the IEEE Infocom 1985 at 93 (Mar. 1985). (TN-IP 0005080-86), 17 pp.
John Jubin & Janet D. Tornow, The DARPA Packet Radio Network Protocols, Proc. of the IEEE, vol. 75, No. 1 at 21 (Jan. 87). (TN-IP 0004930-41).
John Jubin, Current Packet Radio Network Protocols, Proc. of the IEEE Infocom1985 at 86 (Mar. 1985), (TN-IP 0004921-29), 9 pp.
David B. Johnson & David A. Maltz, Dynamic Source Routing in Ad Hoc Wireless Networks, reprinted in Mobile Computing, 153, Kluwer Academic Publishers (Tomasz Imielinski & Henry F. Korth eds., 1996), (TN-IP 0006929-46), 18 pp.
David B. Johnson, Mobile Host Internetworking Using IP Loose Source Routing, Carnegie Mellon University CMU-CS-93-128, DARPA Order No. 7330 (Feb. 1993), (TN-IP 0006911-28), 18 pp.
Daniel M. Frank, Transmission of IP Datagrams Over NET/ROM Networks, Proc. of the ARRL 7th Computer Networking Conference 1988 at 65 (Oct. 1988), (TN-IP 0006591-96), 6 pp.
Robert E. Kahn, et al., Advances in Packet Radio Technology, Proc. of the IEEE, vol. 66, No. 11, pp. 1468-1496 (Nov. 1978), (TN-IP 0004942-71).
Clifford A. Lynch & Edwin B. Brownrigg, Packet Radio Networks, Bergamon Press, 259-74 (1987), (TN-IP 0004018-175).
Charles E. Perkins & Pravin Bhagwat, Highly Dynamic Destination-Sequenced Distance-Vector Routing (DSDV) for Mobile Computers, ACM SIGCOMM Computer Communication Review, vol. 24, Issue 4 at 234 (Oct. 1994), (TN-IP 0005018-28), 11 pp.
William MacGregor, Jil Westcott, & Michael Beeler, Multiple Control Stations in Packet Radio Networks, 1982 IEEE Military Communications Conference, vol. 3 at 10.3-1 (Oct. 1982), (TN-IP 0004988-93), 6 pp.
Nachum Shacham & Jil Westcott, Future Directions in Packet Radio Architectures and Protocols, Proc. of the IEEE, vol. 75, No. 1 at 83 (Jan. 1987), (TN-IP 0008712-28), 17 pp.
David B. Johnson and David A. Maltz, Protocols for Adaptive Wireless and Mobile Networking, IEEE Personal Communications, Feb. 1996, p. 34-42.
Arek J. Dadej and Daniel Floreani, Interconnected Mobile Radio Networks—A step Towards Integrated Multimedia Military Communications, Communications and Networks for the Year 2000, IEEE Singapore International Conference on Networks/International Conference on Information Engineering '93, vol. 1, p. 152-156.
David A. Beyer, Accomplishments of the DARPA SURAN Program, IEEE MILCOM 1990, p. 39.6.1-8.
William S. Hortos, Application of Neural Networks to the Dynamic Spatial Distribution of Nodes within an Urban Wireless Network, SPIE, vol. 2492, p. 58-70, 1995.
Nachum Shacham and Richard G. Ogier, Network Control and Data Transport for C3I Applications, IEEE 1987, p. 30.5.1-6.
John E. Rustad, Reidar Skaug, and Andreas Aasen, New Radio Networks for Tactical Communication, IEEE Jornal on Selected Areas in Communications, vol. 8, No. 5, p. 713-27, Jun. 1990.
Barry M. Leiner, Donald L. Nielson, and Fouad A. Tobagi, Issues in Packet Radio Network Design, Proceedings of the IEEE, vol. 75, No. 1, p. 6-20, Jan. 1987.
Janet Tornow, Functional Summary of the DARPA SURAP1 Network, DARPA, Sep., 1986, 17 pp.
John F. Shoch and Lawrence Stewart, Interconnecting Local Networks via the Packet Radio Network, Sixth Data Communications Symposium, Nov. 1979, pp. 153-158.
J.R. Cleveland, Performance and Design Considerations for Mobile Mesh Networks, IEEE MILCOM 96, vol. 1, p. 245-49.
Cmdr. R. E. Bruninga, USN, A Worldwide Packet Radio Network, Signal, vol. 42, No. 10, p. 221-230, Jun. 1988.

(56) References Cited

OTHER PUBLICATIONS

Nachum Shacham and Janet Tornow, Packet Radio Networking, Telecommunications, vol. 20, No. 9, p. 42-48, 64, 82, Sep. 1986.
Spencer T. Carlisle, Edison's NetComm Project, IEEE 1989, Paper No. 89CH2709-4-B5, p. B5-1-B5-4.
Brian H. Davies and T.R. Davies, The Application of Packet Switching Techniques to Combat Net Radio, Proceedings of the IEEE, vol. 75, No. 1, p. 43-55, Jan. 1987.
Fouad A. Tobagi, Richard Binder, and Barry Leiner, Packet Radio and Satellite Networks, IEEE Communications Magazine, vol. 22, No. 11, p. 24-40, Nov. 1984.
M. Scott Corson, Joseph Macker, and Stephen G. Batsell, Architectural Considerations for Mobile Mesh Networking, IEEE MILCOM 96, vol. 1, p. 225-9.
K.Y. Eng, et. al., Bahama: A Broadband Ad-Hoc Wireless ATM Local-Area Network, 1995 IEEE International Conference on Communications, vol. 2, p. 1216-23, Jun. 18-22, 1995.
J. Jonquin Garcia-Luna-Aceves, A Fail-Safe Routing Algorithm for Multihop Packet-Radio Networks, IEEE INFOCOM '86, p. 434-43, Apr. 8-10, 1986.
Johanes P. Tamtomo, A Prototype of TCP/IP-Based Internet-PRNET for Land Information Networks and Services, Department of Surveying Engineering, University of New Brunswick, Jan. 25, 1993, 118 pp.
A. Alwan, et al., Adaptive Mobile Multimedia Networks, IEEE Personal Communications, p. 34-51, Apr. 1996.
Michael Ball, et al., Reliability of Packet Switching Broadcast Radio Networks, IEEE Transactions on Circuits and Systems, vol. Cas-23, No. 12, p. 806-13 ,Dec. 1976.
Kenneth Brayer, Implementation and Performance of Survivable Computer Communication with Autonomous Decentralized Control, IEEE Communications Magazine, p. 34-41, Jul. 1983.
Weidong Chen and Eric Lin, Route Optimization and Locations Updates for Mobile Hosts, Proceedings of the 16th ICDCS, p. 319-326, 1996.
Daniel Cohen, Jonathan B. Postel, and Raphael Rom, IP Addressing and Routing in a Local Wireless Network, IEEE INFOCOM 1992, p. 5A.3.1-7.
Charles Perkins and David B. Johnson, Mobility Support in IPv6, Sep. 22, 1994, http//www.monarch.cs.rice.edu/internet-drafts/draft-perkins-ipv6-mobility-sup-00.txt (last visited Sep. 26, 2009).
Jonathan J. Hahn and David M. Stolle, Packet Radio Network Routing Algorithms: A Survey, IEEE Communications Magazine, vol. 22, No. 11, p. 41-7, Nov. 1984.
David A. Hall, Tactical Internet System Architecture for the Task Force XXI, IEEE 1996, p. 219-30.
Robert Hinden and Alan Sheltzer, The DARPA Internet Gateway, DARPA RFC 823, Sep. 1982, 45 pp.
Manuel Jimenez-Cedeno and Ramon Vasquez-Espinosa, Centralized Packet Radio Network: A Communication Approach Suited for Data Collection in a Real-Time Flash Flood Prediction System, Dept. of Electrical and Computer Engineering, University of Puerto Rico-Mayaguez, ACM 0-89791-568-2/93, p. 709-13, 1993.
David B. Johnson, Routing in Ad Hoc Networks of Mobile Hosts, Workshop on Mobile Computing Systems and Applications, Dec. 8-9, 1994, Santa Cruz, California, IEEE 1995, p. 158-63.
David B. Johnson, Route Optimization in Mobile IP, Nov. 28, 1994, http://www.monarch.cs.rice.edu/internet-drafts/draft-ietf-mobileip-optim-00.txt (last visited Sep. 26, 2009), 32 pp.
Mark G. Lewis and J.J. Garcia-Luna-Aceves, Packet-Switching Applique for Tactical VHF Radios, 1987 IEEE MILCOM Communciations Conference, Oct. 19-22, 1987, Washington, D.C., p. 21.2.1-7.
Sioe Mak and Denny Radford, Design Considerations for Implementation of Large Scale Automatic Meter Reading Systems, IEEE Transactions on Power Delivery, vol. 10, No. 1, p. 97-103, Jan. 1995.
Charles E. Perkins and Pravin Bhagwat, A Mobile Networking System Based on Internet Protocol, IEEE Personal Communications, First Quarter 1994, IEEE 1994, p. 32-41.
Richard Schulman, Richard Snyder, and Larry J. Williams, SINCGARS Internet Controller-Heart of the Digitized Battlefield, Proceedings of the 1996 Tactical Communications Conference, Apr. 30-May 2, 1996, Fort Wayne, Indiana, p. 417-21.
Nachum Shacham and Earl J. Craighill, Dynamic Routing for Real-Time Data Transport in Packet Radio Networks, Proceedings of INFOCOM 1982, IEEE 1982, p. 152-58.
R. Lee Hamilton, Jr. and Hsien-Chuen Yu, Optimal Routing in Multihop Packet Radio Networks, IEEE 1990, p. 389-96.
Carl A. Sunshine, Addressing Problems in Multi-Network Systems, Proceedings of INFOCOM 1982, IEEE 1982, p. 12-18.
J.J. Garcia-Luna-Aceves, Routing Management in Very Large-Scale Networks, North-Holland, Future Generations Computer Systems 4, 1988, pp. 81-93.
J.J. Garcia-Luna-Aceves, A Minimum-hop Routing Algorithm Based on Distributed Information, North-Holland, Computer Networks and ISDN Systems 16, 1988/1989, p. 367-382.
D. Hubner, J. Kassubek, F. Reichert, A Distributed Multihop Protocol for Mobile Stations to Contact a Stationary Infrastructure, Third IEE Conference on Telecommunications, Conference Publication No. 331, p. 204-7.
Jens Zander and Robert Forchheimer, The SOFTNET Project: A Retrospect, IEEE EUROCON, Jun. 13-17, 1988, p. 343-5.
Mario Gerla and Jack Tzu-Chich Tsai, Multicluster, Mobile, Multimedia Radio Network, Wireless Networks 1, J.C. Baltzer AG, Science Publishers, 1995, p. 255-265.
F. G. Harrison, Microwave Radio in the British TeleCom Access Network, Second IEE National Conference on Telecommunications, Conference Publication No. 300, Apr. 2-5, 1989, p. 208-13.
Chai-Keong Toh, A Novel Distributed Routing Protocol to Support Ad-Hoc Mobile Computing, Conference Proceedings of the 1996 IEEE Fifteenth Annual International Phoenix Conference on Computers and Communications, Mar. 27-29, 1996, p. 480-6.
Fadi F. Wahhab, Multi-Path Routing Protocol for Rapidly Deployable Radio Networks, Thesis submitted to the Department of Electrical Engineering and Computer Science of the University of Kansas, 1994, 59 pp.
Jil Westcott and Gregory Lauer, Hierarchical Routing for Very Large Networks, IEEE MILCOM 1984, Oct. 21-24, 1984, Conference Record vol. 2, p. 214-8.
International Search Report and Written Opinion for Application No. PCT/US08/13027, dated Feb. 9, 2009, 6 pp.
International Search Report and Written Opinion for Application No. PCT/US08/13023, dated Jan. 12, 2009, 10 pp.
International Search Report and Written Opinion for Application No. PCT/US08/13019, dated Jan. 12, 2009, 13 pp.
International Search Report and Written Opinion for Application No. PCT/US08/13025, dated Jan. 13, 2009, 7 pp.
International Search Report and Written Opinion for Application No. PCT/US08/13018, dated Jan. 30, 2009, 9 pp.
International Search Report and Written Opinion for Application No. PCT/US08/13020, dated Jan. 9, 2009, 8 pp.
International Search Report and Written Opinion for Application No. PCT/US08/13028, dated Jan. 15, 2009, 9 pp.
International Search Report and Written Opinion for Application No. PCT/US08/13021, dated Jan. 15, 2009, 11 pp.
International Search Report and Written Opinion for Application No. PCT/US08/13016, dated Jan. 9, 2009, 7 pp.
International Search Report and Written Opinion for Application No. PCT/US08/13024, dated Jan. 13, 2009, 9 pp.
International Search Report and Written Opinion for Application No. PCT/US08/13022, dated Jan. 27, 2009, 10 pp.
International Search Report and Written Opinion for Application No. PCT/US08/13030, dated Jan. 9, 2009, 7 pp.
International Search Report and Written Opinion for Application No. PCT/US08/12161, dated Mar. 2, 2009, 13 pp.
International Search Report and Written Opinion for Application No. PCT/US08/13017, dated Mar. 18, 2009, 11 pp.
International Search Report and Written Opinion for Application No. PCT/US08/13026, dated Feb. 24, 2009, 9 pp.
International Search Report and Written Opinion for Application No. PCT/US08/13029, dated Feb. 2, 2009, 8 pp.

(56) References Cited

OTHER PUBLICATIONS

International Search Report and Written Opinion for Application No. PCT/US08/13032, dated May 12, 2009, 14 pp.
International Search Report and Written Opinion for Application No. PCT/US09/05008, dated Oct. 22, 2009, 8 pp.
Leis, John, "TPC/IP Protocol Family," pp. 1 and 42-43, Apr. 3, 2006.
Supplementary European Search Report for Application No. EP 08 85 1869, dated Dec. 30, 2010, 7 pp.
International Search Report and Written Opinion for Application No. PCT/US10/26956, dated May 19, 2010, 2 pp.
Supplementary European Search Report for Application No. EP 08 85 1132, dated Dec. 6, 2010, 9 pp.
Baumann, R., et al., "Routing Packets Into Wireless Mesh Networks," *Wireless and Mobile Computing, Networking and Communications*, 2007, WIMOB 2007, Third IEEE International Conference, Piscataway, NJ, Oct. 8, 2007, p. 38 (XP031338321).
Levis Stanford University, J. P. Vasseur, Cisco Systems, et al., "Overview of Existing Routing Protocols for Low Power and Lossy Networks," draft-levis-rl2n-overview-protocols-02.txt, IETF Standard-Working-Draft, Internet Engineering Task Force, IETF, Ch, No. 2, Nov. 17, 2007 (XP015054252) (ISSN: 0000-0004).
Culler Arch Rock, J.P. Vasseur, Cisco Systems, et al., "Routing Requirements for Low Power and Lossy Networks, draft-culler-rl2n-routing-reqs-01.txt," IETF StandardWorking-Draft, Internet Engineering Task Force, IETF, Ch, No. 1, Jul. 7, 2007 (XP015050851) (ISSN: 000-0004).
Perkins, C. E., et al., "Ad Hoc On-Demand Distance Vector (AODV) Routing," Network Working Group Internet Draft, XX, Nov. 9, 2001 (XP002950167).
Postel, J., "RFC 793 Transmission Control Protocol," Sep. 1981 [retrieved on Jan. 1, 2007], Retrieved From the Internet: http://www.ietf.org/rfc/rfc0793.txt.
Supplementary European Search Report for Application No. EP 08 85 1927, dated Dec. 22, 2010, 10 pp.
Younis, M., et al., "Energy-Aware Routing in Cluster-Based Sensor Networks," Modeling, Analysis and Simulation of Computer and Telecommunications Systems, 10th IEEE Proceedings on Mascots, Oct. 11-16, 2002, Piscataway, NJ (XP010624424) (ISBN: 978-0-7695-1840-4).
Supplementary European Search Report for Application No. EP 08 85 3052, dated Mar. 18, 2011, 10 pp.
Supplementary European Search Report for Application No. EP 08 85 1560, dated Mar. 24, 2011, 9 pp.
Supplementary European Search Report for Application No. EP 08 85 2992, dated Mar. 23, 2011, 6 pp.
International Search Report and Written Opinion for Application No. PCT/US2011/060694, dated Apr. 9, 2012, 10 pp.
International Search Report and Written Opinion for Application No. PCT/US2011/049227, dated Jan. 31, 2012, 9 pp.
International Search Report and Written Opinion for Application No. PCT/US12/22334, dated Apr. 9, 2012, 9 pp.
International Search Report and Written Opinion for Application No. PCT/US11/56620, dated Mar. 13, 2012, 8 pp.
Supplementary European Search Report for Application No. EP 08 84 2449, dated Nov. 29, 2011, 5 pp.
Lin, Shen, et al., "A Wireless Network Based on the Combination of Zigbee and GPRS" [online], [retrieved on Feb. 16, 2012], IEEE International Conference on Networking, Sensing and Control, Apr. 6-8, 2008, 4 pp., Retrieved From the Internet: http://ieeexplore.ieee.org/xpls/abs$_{13}$ all.jsp?arnumber=4525223.
Telegesis, "ZigBee Gateway Makes Your Meter Smart" [online], 2005 [retrieved on Feb. 16, 2012], 1 p., Retrieved From the Internet: http://www.telegesis.com/downloads/general/SSV%20IP%20gateway%20case%20study.pdf.
Supplementary European Search Report for Application No. EP 09 81 1849, dated Dec. 13, 2011, 9 pp.
Gerla, Mario, et al., Multicasting Protocols for High-Speed, Wormhole-Routing Local Area Networks, ACM SIGCOMM Computer Communication Review, vol. 26, No. 4, Oct. 4, 1996, pp. 184-193.
International Search Report and Written Opinion for Application No. PCT/US2011/049277, dated Jan. 31, 2012, 9 pp.
International Search Report and Written Opinion for Application No. PCT/US11/21167, dated Mar. 21, 2012, 8 pp.
"UCAIug Home Area Network System Requirements Specification, A Work Product of the OpenHAN Task Force Formed by the SG Systems Working Group Under the Open Smart Grid (OpenSG) Technical Committee of the UCA® International Users Group, Version 2.0," 157 pp., Aug. 30, 2010.
"ZigBee Smart Energy Profile Specification," ZigBee Profile: 0x0109, Revision 15, Dec. 1, 2008, Document 075345r15 (SEP Document), 244 pp.
Edison Electric Institute (EEI), "Uniform Business Practices for Unbundled Electricity Metering, Volume Two," Dec. 5, 2000, 196 pp., www.naesb.org/pdf/ubp120500.pdf.
"ZigBee Smart Energy Profile Specification," ZigBee Profile: 0x0109, Revision 16, Version 1.1, Document 075356r16ZB, 332 pp., Mar. 23, 2011.
"ZigBee Over-the-Air Upgrading Cluster," ZigBee Alliance, Document 095264r18, Revision 18, Version 1.0, 63 pp., Mar. 14, 2010.
IEEE Standard for Information Technology—Telecommunications and Information Exchange Between Systems—Local and Metropolitan Area Networks—Specific Requirements, "Part 15.4: Wireless Medium Access Control (MAC) and Physical Layer (PHY) Specifications for Low-Rate Wireless Personal Area Networks (WPANs)," IEEE Computer Society, 323 pp., Sep. 8, 2006.
IEEE Standard for Information Technology—Telecommunications and Information Exchange Between Systems—Local and Metropolitan Area Networks—Specific Requirements, "Part 15.4: Wireless Medium Access Control (MAC) and Physical Layer (PHY) Specifications for Low-Rate Wireless Personal Area Networks (LR-WPANs)," IEEE Computer Society, 679 pp., Oct. 1, 2003.
"ZigBee Cluster Library Specification," ZigBee Alliance, Document 075123r02ZB, 420 pp., May 29, 2008.
Liu, Ryan, et al., "A Survey of PEV Impacts on Electric Utilities," *EEE PES Innovative Smart Grid Technologies Conference*, Anaheim, California, 8 pp., Jan. 17-19, 2011.
"Utility/Lab Workshop on PV Technology and Systems," DTE Energy DER Technology Adoption, DEW Analysis of Renewable, PEV & Storage, Tempe, Arizona, 36 pp., Nov. 8-9, 2010.
International Search Report and Written Opinion for Application No. PCT/US12/28135, dated Jul. 5, 2012, 7 pp.
"Network Device: Gateway Specification," ZigBee Alliance, ZigBee Document 075468r35, Revision 35, Version No. 1.0, 301 pp., Mar. 23, 2011.

* cited by examiner

SYSTEM AND METHOD FOR MANAGING LOAD DISTRIBUTION ACROSS A POWER GRID

CROSS-REFERENCE TO RELATED APPLICATIONS

The present application claims the benefit of similarly titled U.S. provisional patent application Ser. No. 61/450,277, filed Mar. 8, 2011, which is incorporated herein by reference in its entirety.

FIELD OF THE INVENTION

The present invention is generally directed to managing a load of one or more transformers in an electricity transporting grid to enable controlled growth of charging plug-in electric vehicles demands beyond a reserved load of supported homes.

BACKGROUND

Pollution-related concerns, coupled with high gasoline prices, increased political tension with the worlds' largest petroleum suppliers, and increasing government support have lead to increased demand for electric vehicles. It is estimated that 10 to 12 carmakers are ready to launch plug-in models by 2015, and the electric vehicle market is expected to grow to over 2.5 million cars by the same year. Such electric vehicles include, for example, plug-in electric vehicles and plug-in hybrid electric vehicles (collectively, "PEVs").

Unfortunately, as the number of PEVs on the road continues to increase, the risk of overloading local distribution transformers also increases. As shown in Table 1, below, recharging a single PEV may consume up to three times as much electricity as a typical home. Accordingly, overloading problems may arise when several PEVs in the same neighborhood recharge at the same time, or during the normal summer peak loads.

TABLE 1

| CHARGING TYPES | LEVEL 1 | LEVEL 2 | LEVEL 3 |
|---|---|---|---|
| VOLTAGE | 120 VAC, Single Phase | 240 VAC, Single Phase | Up to 600 VDC |
| ELECTRIC LOAD | 2 KW | 8 KW | 150 KW |
| CHARGING TIME | 8-16 Hours | 4-8 Hours | 10-50 Minutes |

FIG. 1 illustrates a simplified view of a basic electricity transporting grid including a power plant for generating electricity 105, a step-up transformer for stepping up voltage for transmission 110, transmission lines for carrying electricity 115, a neighborhood or substation transformer 120 for a first step down, a distribution line 125 for carrying electricity to customer premises and, finally, distribution transformers 130 for a second step down in voltage for in-premise use. In the illustrated two-tier step-down transformer configuration, the substation transformers 120 manage the load of distribution transformers 130. At each tier there is a risk of overloading (regional or local) if the dynamic behavior is not well monitored.

As shown, a distribution transformer 130 reduces the primary voltage of the electric distribution system to a utilization voltage serving customers in homes and businesses. Generally, a distribution transformer 130 may be a static device constructed with two or more windings used to transfer alternating current electric power by electromagnetic induction from one circuit to another at the same frequency but with different values of voltage and current. Distribution transformers 130 are often deployed in clusters (e.g., 3) to serve a block of homes. For example, a typical 25 kVA distribution transformer 130 serves approximately 10 homes, while a substation transformer 120 can carry 1000 s of kVA.

If one or more homes mapped to a particular distribution transformer 130 adds a particularly large load, such as a PEV, this may increase the risk of overloading the mapped distribution transformer. Further, even if a single distribution transformer 130 could handle the increased load, if a number of the distribution transformers mapped to a substation transformer 120 take on increased loads due to PEVs (or other electricity-requiring apparatuses), the cumulative effect could overload the mapped substation transformer. Accordingly, the load demands of the emerging PEV market are expected to affect the performance of the power grid on multiple levels, including the local level. This is exacerbated by the fact that transformers are typically in varied stages of useful life, with some approaching their capacity loading with the existing growth.

PEVs represent a major addition in load on a transformer. By way of example, FIG. 2 illustrates the projected impact of adding three PEVs to a single distribution transformer, where each PEV draws the equivalent of one-third the amount of power as a single home. As discussed above (see Table 1) the demand of a single PEV may be as high as about three times the load of a single home.

FIG. 2 illustrates the standard (expected) load shape L1 for a warm summer day for 8-12 smaller, older homes per 25 kVA circuit; the expected load L2 with the addition of three PEVs each at 1.4 kW charging requirement; and the expected load L3 at 3.3 kW charging requirement. As shown, even without the additional demands of the PEVs, the demand already reaches peak capacity of the transformer in the evening, when people are home from work with air conditioners and other loads using the system (see L2).

Impacts of overloading transformers in the distribution system may include: phase imbalance, power quality issues, transformer degradation and failure, as well as circuit breaker and fuse blowout as described in Ryan Liu, et al, *A Survey of PEV Impacts on Electric Utilities*, IEEE PES conference Jan. 17, 2011, which is incorporated herein by reference in its entirety. A presentation by Hawk Asgeirsson, P.E. of DTE Energy titled, *DTE Energy DER Technology Adoption DEW analysis of Renewable, PEV & Storage*, presented at the Utility/Lab Workshop on PV Technology and Systems Nov. 8-9, 2010 in Tempe Ariz. is incorporated herein by reference and provides additional background and details regarding the PEV charging challenges and limitations that the invention described herein will help to overcome.

One obvious solution that is used and contemplated in the face of increasing load demand is the replacement or upgrading of transformers to meet new and expected demand. However, mass replacements are expensive and could be prohibitively so in the case of expected PEV strain. Further, such replacements/upgrades would be wasteful in many cases, where current transformers were or would have been sufficient to meet demand. Further still, replacement/upgrades may be insufficient to meet booming demand.

Ideally, the ability to monitor and track transformer load could help facilitate targeted replacement. U.S. Pat. No. 6,711,512, which is incorporated herein by reference in its entirety, describes a system for measuring, in real time, a variety of load parameters (e.g., phase voltages, phase currents and temperatures—See Table 2 below) of a pole transformer placed on a distribution line and transferring measurements wirelessly to a central monitoring station. This system requires the addition of a sensor at the transformer. Accordingly, the transformer load data could be used to determine, based on historical load information, where a transformer (or possibly other grid equipment) might need to be upgraded or added to accommodate historical loads. However, this would not mitigate immediate transformer load concerns.

TABLE 2

|  | Units | Communication | | |
|---|---|---|---|---|
|  |  | Alarm | Local | Remote |
| Transformer Parameters | | | | |
| Tank pressure | psi | Y | Y | Y |
| Tank vacuum | psi | Y | Y | Y |
| Oil temperature | ° | Y | Y | Y |
| Winding temperature | ° | Y | Y | Y |
| Pressure relief device operation | on/off | Y | Y | Y |
| Sudden pressure relay operation | on/off | Y | Y | Y |
| Liquid level | on/off | Y | Y | Y |
| Hydrogen gas % | % | N | N | Y |
| Water content in oil | % | N | N | Y |
| System Parameters | | | | |
| Fans on | on/off | Y | Y | Y |
| Loss of control power | on/off | Y | Y | Y |
| Ambient temperature | ° |  |  | Y |
| Input current | amps | N | N | Y |
| Input voltage | volts | N | N | Y |
| Output current | amps | N | N | Y |
| Output voltage | volts | N | N | Y |

With respect to PEV loads in particular, a contemplated solution for meeting increased demand is to request that home owners notify their utility of every new PEV purchase, so that the utility can (statically) retrofit the available transformer capacity over time in order to plan for peak demands. However this may not always be easy to manage, and does not consider the scenario of charging away from home. Further, load limitations discussed above may be localized to a (static) transformer and may be difficult to manage from an ultimate utility head-end without visibility to the instantaneous/accumulated load per transformer.

Accordingly, there is a need in the art for systems and methods for stabilizing a power grid to accommodate simultaneous charging of PEVs to prevent uncontrollable load on transformers. The system should be able to handle PEV charging demands that are expected to vary spatially (depending on market penetration, system configuration and socio-economics), and temporally (depending on driving patterns, battery sizes and charging connection types—see Table 1, above). Further, the system should be able to handle PEV charging impacts due to clustering (simultaneous charging at homes located on a single distribution transformer). Further still, there is a need for methods and systems that can accommodate several PEV charging scenarios, including scenarios where a PEV plugs in for an immediate charge; others where, after negotiation, a PEV may charge at a future time (e.g., hours later when rates are more affordable) at a negotiated charging rate; and still others which allow PEVs to roam between charging stations (e.g., occasionally charge away from home) and be billed to the owner's account independent of the charging location.

DOCUMENTS INCORPORATED BY REFERENCE

The present application hereby references and incorporates by reference each of the following United States patent applications in their entirety:

Ser. No. 12/275,236 entitled "Point-to-Point Communication Within a Mesh Network," filed Nov. 21, 2008 (TR0004-US);
Ser. No. 12/275,305 entitled "Transport Layer and Model For an Advanced Metering Infrastructure (AMI) Network," filed Nov. 21, 2008 (TR0003-US);
Ser. No. 12/275,237 entitled "System and Method For Application Layer Time Synchronization Without Creating a Time Discrepancy or Gap in Time," filed Nov. 21, 2008 (TR0006-US);
Ser. No. 12/275,238 entitled "Communication and Message Route Optimization and Messaging in a Mesh Network," filed Nov. 21, 2008 (TR0007-US);
Ser. No. 12/275,242 entitled "Collector Device and System Utilizing Standardized Utility Metering Protocol," filed Nov. 21, 2008 (TR0009-US);
Ser. No. 12/275,251 entitled "Power-Conserving Network Device For Advanced Metering Infrastructure," filed Nov. 21, 2008 (TR0018-US);
Ser. No. 12/275,252 entitled "Method and System For Creating and Managing Association and Balancing of a Mesh Device in a Mesh Network," filed Nov. 21, 2008 (TR0020);
Ser. No. 12/275,257 entitled "System and Method for Operating Mesh Devices in Multi-Tree Overlapping Mesh Networks," filed Nov. 21, 2008 (TR0038-US);
Ser. No. 12/554,135 entitled "System and Method for Implementing Mesh Network Communications using a Mesh Network Protocol," filed Sep. 4, 2009; and
Ser. No. 12/721,948 entitled "Process, Device and System for Mapping Transformers to Meters and Locating Non-technical Line Losses," filed Mar. 11, 2010 (TR0063).

SUMMARY OF THE INVENTION

Embodiments of the invention provide methods and systems for stabilizing a power grid to accommodate simultaneous charging of PEVs to prevent uncontrollable load on transformers (e.g., distribution transformers and/or substation transformers). In certain embodiments, a system may allow for PEV charging demands that vary both spatially and temporally. The system may prevent damage to an electrical grid due to PEV clustering and/or may accommodate several PEV charging scenarios, including scenarios where: (1) a PEV plugs in for an immediate charge; (2) a PEV charges at a future time at a negotiated charging rate; and (3) a PEV roams between charging stations. The system may allow away-from-home charging to be billed to the PEV owner's account independent of the charging location.

In one aspect of the invention a method for scheduling a charge of a plug-in electric vehicle (PEV) is provided. The method may include receiving, by a load management system, PEV information from a PEV plugged into an electric vehicle supply equipment (EVSE). The method also includes receiving, by the load management system, transformer information from a transformer management system, the transformer information relating to a transformer associated with the EVSE. Once the PEV information and transformer information are received, the load management system may determine charging information based on this information. The charging information may then be provided to the PEV, for example, via the EVSE.

In another aspect of the invention, a system for scheduling a charge of a plug-in electric vehicle (PEV) is provided. The system may include a smart meter network having one or more field nodes, such as but not limited to meters and/or transformer agents. The system may also include a load management system in communication with the smart meter network. A transformer management system may also be included. The transformer management system may be in communication with the load management system, the smart meter network and a distribution transformer. Moreover, an electric vehicle supply equipment (EVSE) may also be in communication with the load meter system and the transformer management system via the smart meter network. The load management system may receive PEV information from a PEV plugged into the EVSE and may also receive transformer information relating to the distribution transformer from the transformer management system. The load management system may then determine charging information based on the PEV information and transformer information and may provide the charging information to the PEV such that it may be charged by the EVSE.

These and other aspects of the invention will be better understood by reading the following detailed description and appended claims.

BRIEF DESCRIPTION OF THE FIGURES

The following figures are exemplary of the aspects of the embodiments described herein and are intended to be considered in conjunction with the descriptions herein.

DETAILED DESCRIPTION

The embodiments and examples presented herein describe systems and methods for preventing power transformer and/or electrical system overloads via admission control mechanisms. The systems and methods described herein may prevent a transformer's load from exceeding a predetermined load threshold. Scheduling PEV charging events by considering instantaneous and/or historical load state of an associated transformer may minimize the risk of the transformer exceeding its peak capacity. Moreover, controlled charging may also help minimize accelerated aging of a transformer. It will be appreciated that, although embodiments specifically refer to admission control of PEV charging scenarios, the invention is not necessarily limited as such, and any embodiment may be generalized to one or more electrical devices requiring electrical load.

Figure 1:
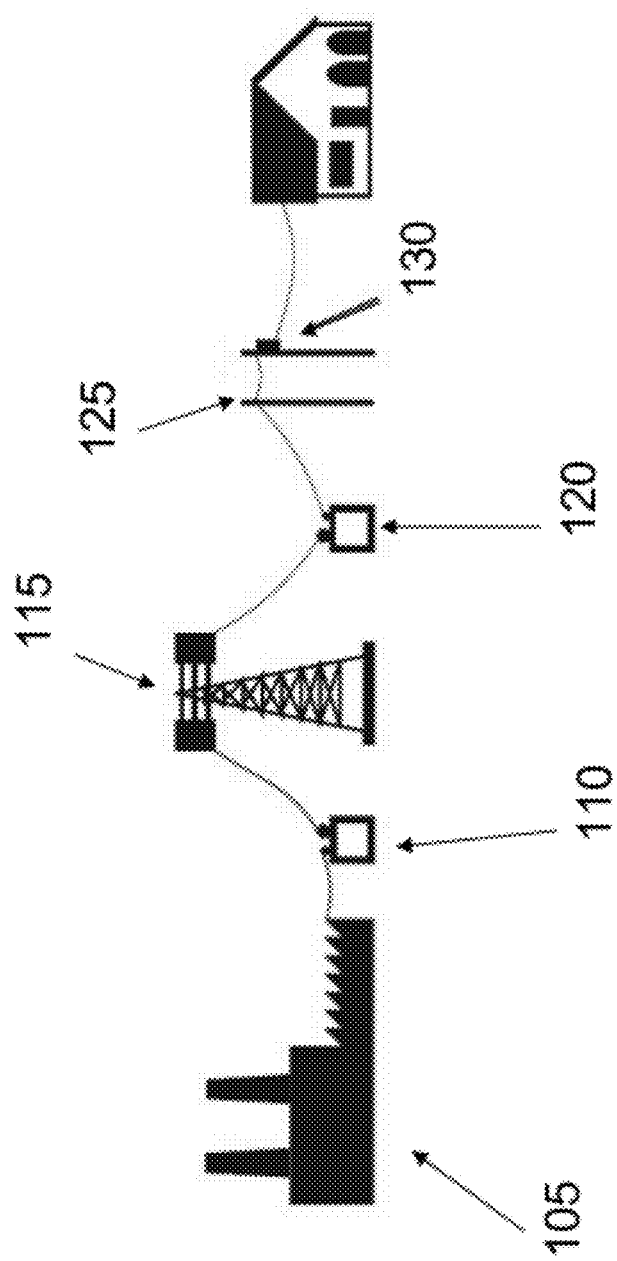
FIG. 1 is a simplified schematic of existing power grid infrastructure for use with the embodiments of the stabilization systems and methods described herein.
Figure 2:
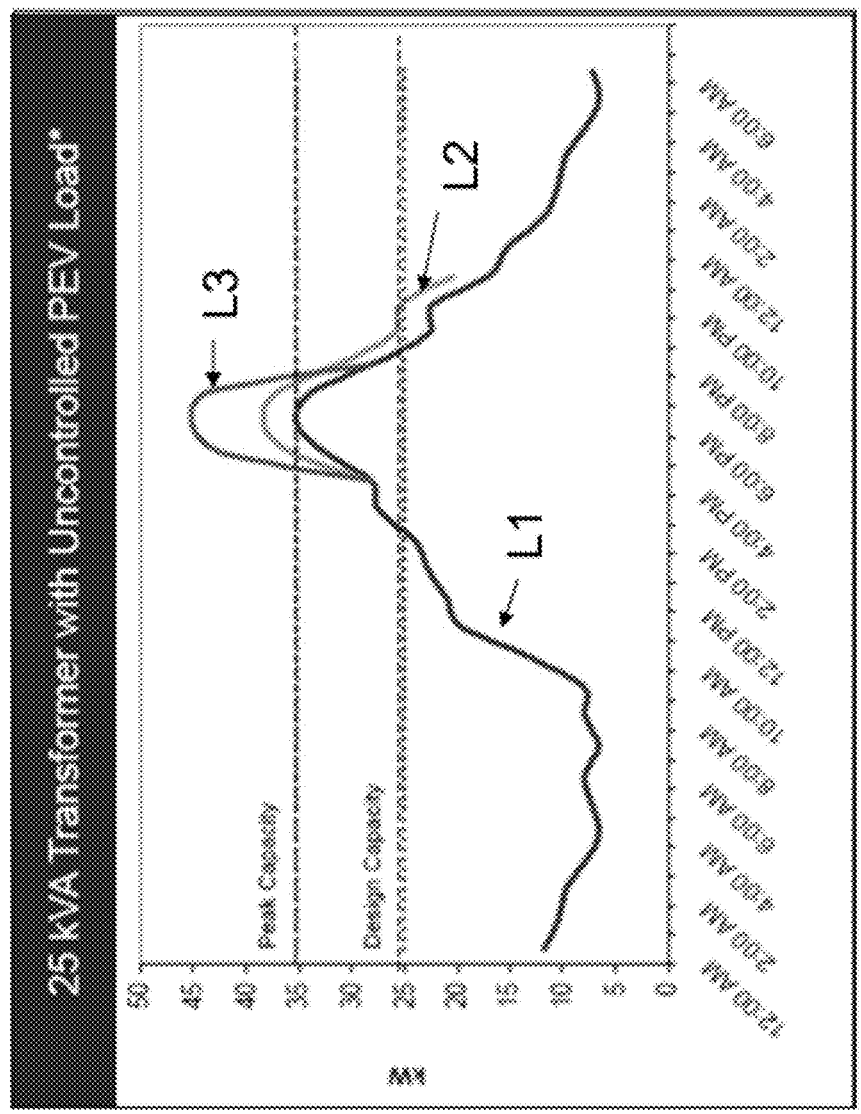
FIG. 2 is an exemplary load graph for a 25 kVA transformer under expected conditions.
Figure 3A:
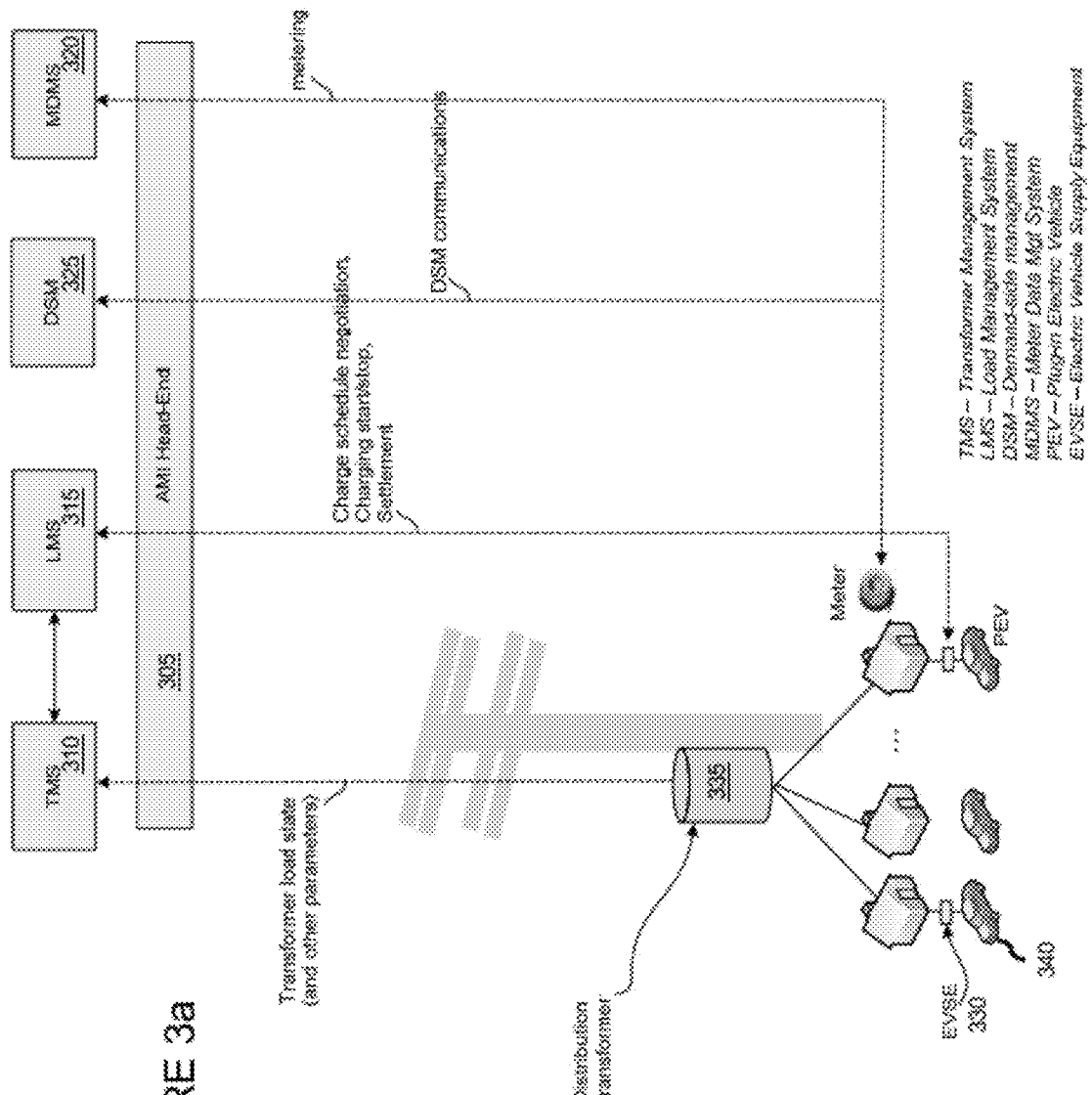
FIGS. 3a and 3b are exemplary smart grid network schematics for use with and including features of the embodiments described herein.
Figure 3B:
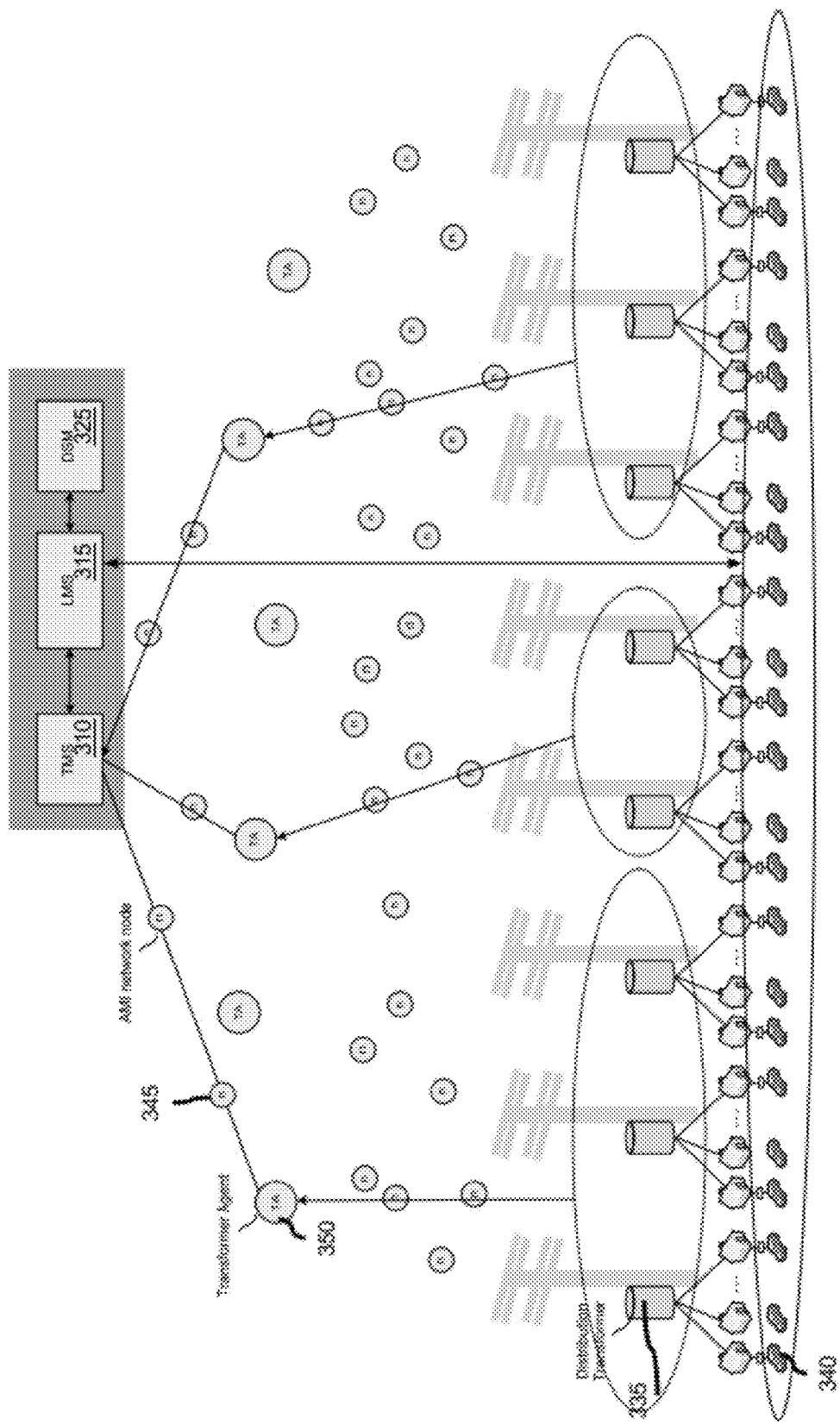

Referring to FIGS. 3a and 3b, different actors and interactions involved with PEV charging as part of a smart grid system (e.g., Advanced Metering Infrastructure (AMI)) are illustrated. Smart grid systems typically measure, collect and analyze utility usage information from advanced devices (e.g., electricity meters) through a network, such as but not limited to a smart meter network, on request or on a pre-defined schedule. The illustrated infrastructure includes hardware, software, communications, customer associated systems and meter data management software. The infrastructure may collect and distribute information to customers, suppliers, utility companies and/or service providers. Additional features of smart grid and smart meter systems are described below and in the documents incorporated herein by reference.

Referring to FIG. 3a, an exemplary stabilization system may comprise one or more of a Transformer Management System ("TMS") 310, a Load Management System ("LMS") 315, an AMI Head End server 305, a Meter Data Management System ("MDMS") 320, Electronic Vehicle Supply Equipment ("EVSE") 330, and a Demand Side Management ("DSM") application 325. As shown, a PEV 340 plugs in (e.g., via the EVSE 330) and communicates with a scheduling application within the LMS 315, e.g., via a smart meter mesh network, or via the Internet. Based on PEV information (e.g., account information, charging plan, EVSE type, preferred charge time, charge rate, etc.), the scheduling application may determine charging information, such as but not limited to, start time, end time, charge duration, and/or a charge rate. The charging information be determined based on a range of variables, including the overall demand, cost of energy, and/or the service tier of the account that the PEV is associated with. The determined charging information may be communicated back to the PEV, and charging may begin at the start time with a settlement to follow upon charging completion.

As shown, a head end server 305 may be a computing device configured to receive information, such as meter readings from one or more meters in a smart meter system. The head end 305 may be configured to transmit instructions to, for example, the TMS, LMS, MDMS, and/or DSM, as desired or required. The head end 305 may be a central processing system including one or more computing systems (i.e., one or more server computers). Where the head end includes more than one computing system, the computing systems can be connected by one or more networks.

The PEV 340 is plugged into the EVSE 330 to receive power via the EVSE from a distribution transformer 335. The EVSE may be located at a PEV owner's home, or may be located at a dedicated charging station (e.g., a gas station). In order to receive power, the PEV may attempt to communicate with a scheduling application within an LMS 315, e.g., via a smart meter network, or via the internet. As discussed in detail below, a PEV charging scheduling program may determine the time and duration during which the PEV will be charged. PEV charging scheduling may take into consideration overall load objectives, dynamic or static consumer energy usage, as well as additional local transformer load states and other parameters that describe how well the transformer would be able to carry the intended load (See Table 2 above).

In one embodiment, a TMS 310 may be responsible for monitoring and/or tracking transformer information of one or more distribution transformers 335. The TMS 310 may provide such transformer information to, for example, an LMS 315, and the LMS may interact with a PEV (e.g., via EVSE 330) to negotiate charging schedules, charging events, as well as billing/settlements.

The TMS may be provisioned with transformer information for each monitored transformer. Such transformer information may comprise, for example, vender/model ID, type of transformer, design capacity, maximum/minimum input voltage parameters, maximum/minimum output voltage parameters, power capacity, duty, frequency range, voltage class, cooling type, magnetic form, constant-potential transformer descriptor, three phase winding configuration, system characteristics (e.g., ungrounded, solidly grounded, high or low resistance grounded, etc.), and efficiency (e.g., excitation, impedance & total losses, resistance, reactance & impedance drop, regulation). Additional information about a transformers condition (e.g., its health) could also be included in this assessment where this information is available, e.g., where the transformer has a health monitoring device. (See Table 2 above).

The transformer information will typically include charge point location information relating to each of the charge point locations serviced by the transformer. The TMS may use this information to track the load of each transformer based on its knowledge of PEV charging events local to the transformers.

In certain embodiments, the TMS may monitor current and/or scheduled charging events at each charge point. For example, the TMS may query the LMS to discover charging schedules and may update a master list or schedule of charging events based on received information. Using the information received from the LMS, and the stored transformer information, the TMS may calculate transformer utilization and/or remaining capacity for a given transformer. Such information (e.g., remaining capacity at a given time, or the number of kW that can be accommodated at a certain time/duration) may be passed on to the LMS upon request, or at predetermined intervals such that the LMS may continue to schedule charging events at optimized times.

In one embodiment, the LMS may query the TMS in order to decide whether, or how, a requested charge event can be supported. For example, when a transformer is close to its design capacity at the targeted charge time, the LMS may propose a different time, charge rate, or deny a request altogether.

The TMS may learn about transformer load states in different ways. For example, each time the LMS schedules a new charging event, this information may be made available (e.g., via a push or periodic pull) to the TMS, which keeps track of the current and expected future load and the utilization of each transformer (i.e., via a calendar). In this example, information may also be provided when PEV charging starts and/or ends.

This embodiment describes centralized logic at the LMS for collecting and processing transformer information. Although the TMS and LMS are shown separately, the systems can be integrated. As another example, distributed agents (e.g., embedded in smart meter network nodes—discussed below) can be used to learn about individual PEV charging situations via a smart meter network, and may communicate this information to a centralized TMS, which deduces each transformer load state accordingly. The LMS could alternatively communicate directly with the agents instead of the centralized TMS.

The DSM application 325 may interact with devices in/around the home (including the PEV while charging) in order to achieve energy savings based on a set of message interactions (i.e., price, load control signals, and/or text messages). In certain embodiments, the DSM application 325 may provide consumers with information relating to price of energy at a particular time. In other embodiments, the DSM application 325 may automatically control energy using devices at a user's place of residence or business.

The MDMS 320 may be in communication with the head end server 305 and may be employed for long term data storage and management for the vast quantities of data that may be delivered from meters (FIG. 3b at 345), PEVs 340, and/or other smart devices located in a user's residence or business. Such data typically includes usage data and/or events imported from the head end server 305. Exemplary events include, a charge start, charge end, or a situation where the charging of PEV is interrupted (e.g., as part of a load shedding campaign).

Referring to FIG. 3b, an exemplary system is illustrated where the collection and processing logic are de-centralized.

As shown, the system comprises a smart grid network, which includes a number of interconnected field nodes (shown as "n") 345. The field nodes 345 may include such equipment as meters and/or mesh gates, and may be operable to communicate information to/from the TMS and/or LMS. Generally, field nodes 345 in the form of meters may include utility sensors and may communicate with a mesh gates over a smart meter network. For example, a meter in the smart meter system may monitor utilities usage, such as electricity usage and usage patterns.

A field node 345 in the form of a mesh gate may be in communication with any number of meters, and may aggregate information from such meters to be transmitted to a head-end sever over a wide area network (WAN). A WAN may be a communication medium capable of transmitting digital information, for example, the Internet, a cellular network, a private network, a phone line configured to carry a dial-up connection, or any other network. Descriptions of exemplary mesh networks, including electric meters, can be found in commonly owned U.S. patent application Ser. No. 12/275,252 titled, "Method and System for Creating and Managing Association and Balancing of a Mesh Device in a Mesh Network," filed Nov. 21, 2008, which is incorporated herein by reference in its entirety.

In certain embodiments, field nodes 345 may be embedded with software and/or hardware based transformer agents (TA) 350 for collecting transformer data and passing it to the LMS and/or TMS. Accordingly, the TAs 350 may communicate with the TMS or may communicate directly with the LMS. In one embodiment, the TMS 310 and/or LMS 315 may be configured to receive information, such as meter readings, from a plurality of TAs 350. The TMS and/or LMS may also be configured to transmit instructions to the TAs. Such TA's may be manufactured or retrofitted with communications modules in order to host agents.

Active TAs 350 associated with a transformer 335 can also be used for real time or near real time system monitoring functions (i.e., network management) that add to the visibility of a smart grid's state. Additionally, load history may be used to predict transformer life expectations for asset management purposes In one embodiment, the TAs 350 may "snoop" on communications between a PEV 340 and the LMS 315 to inform the TMS 310 of selected relevant messages. In this case the TMS may need to derive the essential transformer information, filter out duplicate messages, and fill the gaps where needed to construct a charging schedule.

Alternatively, TAs 350 may serve as proxies to the LMS. In this case the PEVs may communicate directly with their regional proxies to determine capacity (regardless of the account status of the requester). Each proxy can locally assess the associated transformers capacity (through its admission control functions) and may decide whether a charging request is feasible, before forwarding it to the LMS. The proxy LMS thus makes local decision (e.g., given known information, whether the transformer can carry the charging request) and the centralized LMS may make global decisions (e.g., whether the charge is acceptable versus regional conditions and user account status).

In either scenario, no changes to the (passive) distribution transformers are required to allow monitoring of their load state, as transformer information is derived from other points in the network. However, whenever transformers are capable of providing their own load and/or health status as discussed herein, this transformer information may also be integrated into the system.

In one embodiment, the TAs 350 may be able to schedule events locally and autonomously (including when there is a communications failure upstream, eliminating a single point of failure problem). In some cases the LMS may comprise or consist essentially of any number of distributed TAs.

When TAs 350 are embedded in a mesh gate of a smart meter network, they may not always have visibility to the same set of charging locations or transformers if the network topology changes (e.g., nodes may re-associate with a different mesh gate and communication may not be possible). This situation requires an additional level of coordination (e.g., via the TMS) to make sure that required data is available at the different agents in order to avoid any gaps. Such coordination may be provided by exemplary systems.

In addition to facilitating the load distribution and negotiations described above with respect to PEV charge scheduling, aggregated transformer load information may be employed in a variety of applications. For example, such information may be used to recommend other charging locations that may be better suited for charging at a specific time, either derived in real time or via statistical trending. Such information may be passed through the smart grid network through the EVSE and to the PEV.

As another example, such information may be used in location-based applications and/or social networks to make recommendations and/or offer incentives to defer charging. Similarly, such information may be used to guide PEVs to other less loaded charging locations (e.g., follow a GPS-guided directions on a map for discounted charging nearby). These implementations may be programmed into the PEV itself or may be presented to a user in the form of a smart phone or GPS application.

In a separate embodiment, communications can occur out of band (i.e., not via the smart meter network), wherein PEVs can report their charging status via a separate network and this data is aggregated in a third party application. Such data may then be used by the LMS (e.g., through web services or manually).

Figure 4:
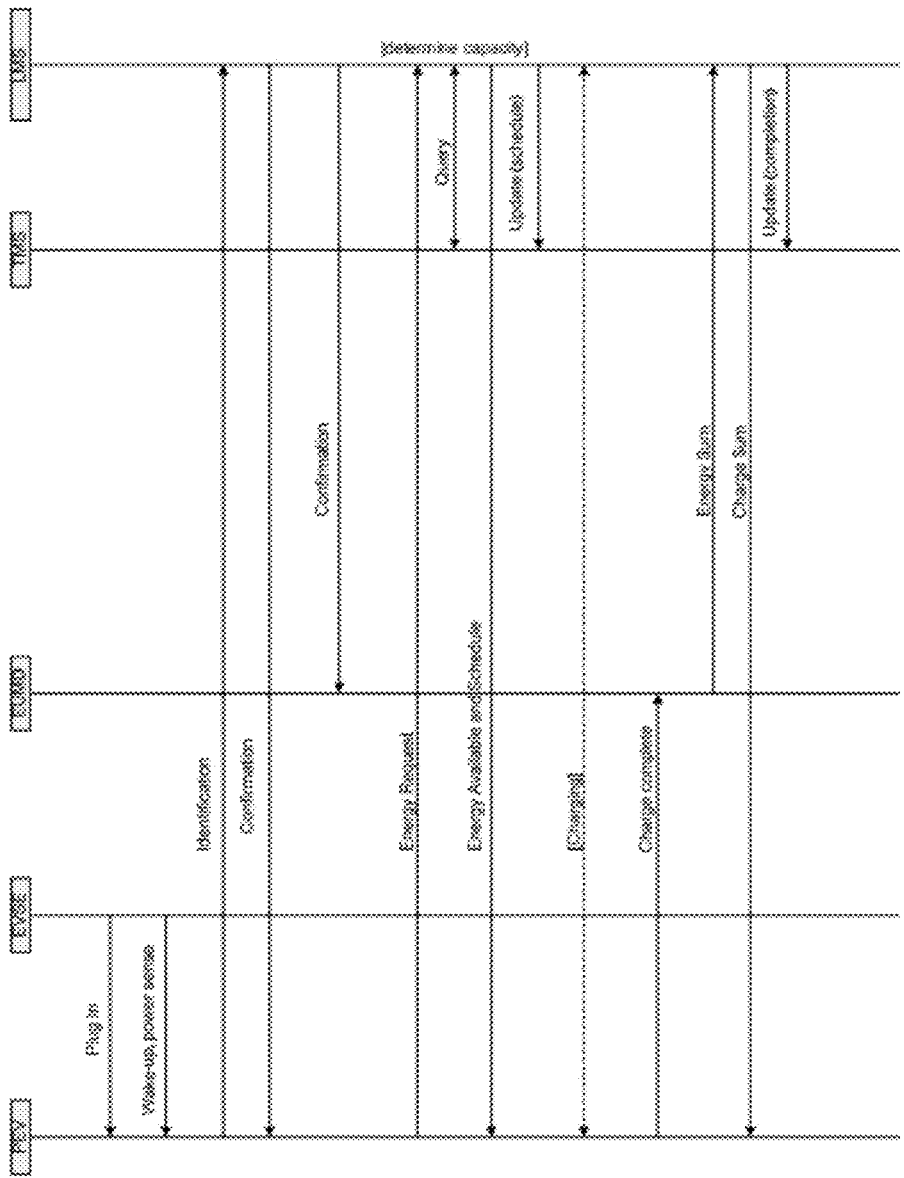
FIG. 4 is an exemplary PEV charging scenario in accordance with the embodiments described herein.

Referring to FIG. 4, an exemplary scenario is illustrated, where a PEV plugs in (e.g., via the EVSE) and communicates with a scheduling application within the LMS, e.g., via the smart meter network, or via the internet. As shown, the PEV is initially plugged into the EVSE, and the connection is sensed by the EVSE causing it to wakeup. The PEV next sends PEV information (identification) to the LMS, and said PEV information is confirmed. Upon confirmation, the PEV sends an energy request to the LMS.

Upon receiving PEV information and an energy request, the LMS queries the TMS for transformer information, and determines charging information, such as but not limited to an optimal charging start time, charging end time, and/or charging duration based on the transformer information. The charging information may be sent to the TMS such that the transformer information may be updated.

Once the charging information is determined, it may be sent to the PEV and charging may occur according to the charging information. Upon completion of the charge, the energy sum may be determined and propagated through the system to the LMS and/or the TMS. Finally, the transformer information may be updated, and the PEV may be billed accordingly.

The embodiments described herein provide for tracking transformer load status with clear visibility of the load conditions of individual transformers. Accordingly, the LMS now has access to transformer load information and can include this in its decision to accept PEV charging requests; thus protecting the transformers and minimizing risk of down time. Charging decisions are made with better coordination and local awareness.

The automated system and processes described herein can be embodied in hardware, software and combinations of hardware and software elements to carry out one or more processes related to load management. The software embodiments and applications including transformer management, load management, demand side management, information collection and other application may include but are not limited to firmware, resident software, microcode, etc. Furthermore, the components of the embodiments can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device. The medium can utilize electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

A data processing system suitable for storing and/or executing program code includes at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks, including various client-server configurations. Modems, cable modem, and Ethernet cards are just a few of the currently available types of network adapters.

Moreover, the disclosed processes may be readily implemented in software, e.g., as a computer program product having one or more modules each adapted for one or more functions of the software, executed on a programmed general purpose computer, cellular telephone, PDA, a special purpose computer, a microprocessor, or the like. In these instances, the systems and methods of this invention can be implemented as a program embedded on a personal computer such as a JAVA®, CGI or Perl script, as a resource residing on a server or graphics workstation, as a routine embedded in a dedicated image system, or the like. The systems and methods of this invention can also be implemented by physically incorporating this system and method into a software and/or hardware system, such as the hardware and software systems of a computer. Such computer program products and systems can be distributed and employ a client-server architecture.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

The methods described herein may include in whole or part workflows. Such workflows may include inquiry and response steps carried out for example via a web-based interface, a spreadsheet, existing software applications, etc. Embodiments of the tool or solution may include workflows that automate the collection and use of information in various ways, e.g., inquiries and responses; polling individuals, entities or users; HTML interfaces; integration with spreadsheets or other applications; and integration with external systems. Such information once collected may be arranged in a desired framework.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

We claim:

1. A method for scheduling a charge of a plug-in electric vehicle (PEV) comprising:
   receiving, by a load management system, PEV information from a PEV plugged into an electric vehicle supply equipment (EVSE), the EVSE being associated with a given transformer of a plurality of transformers for charging one or more PEV;
   acquiring, by a meter network, load information from each of a plurality of meters in the meter network, where one or more of the plurality of meters is associated with the given transformer;
   determining, by a transformer management system, transformer information for said given transformer based on load information acquired by the one or more of the plurality of meters associated with the given transformer;
   receiving, by the load management system, the transformer information of the given transformer associated with the EVSE;
   determining, by the load management system, charging information based on the PEV information and transformer information; and
   providing, by the load management system, the charging information to the PEV.

2. A method according to claim 1, wherein the PEV information comprises one or more of the group consisting of account information, charging plan, EVSE type, preferred charge time, power required, and charge rate.

3. A method according to claim 1, wherein the transformer information comprises one or more of the group consisting of vender/model ID, type of transformer, transformer capacity, maximum input voltage, minimum input voltage, duty, frequency range, voltage class, cooling type, magnetic form, and three phase winding configuration.

4. A method according to claim 1, wherein the charging information comprises one or more of the group consisting of charge start time, charge end time, charge duration, and charge rate.

5. A method according to claim 1, further comprising confirming, by the load management system, the PEV information.

6. A method according to claim 1, further comprising charging the PEV according to the charging information.

7. A method according to claim 1 further comprising: receiving, by the transformer management system, the PEV information; receiving, by the transformer management system, the charging information; and updating, by the transformer management system, the transformer information of the given transformer based on the charging information and PEV information.

8. A method according to claim 1, wherein said load management system, said transformer management system, and said EVSE are in communication via a smart meter network.

9. A method according to claim 8, wherein said smart meter network comprises one or more transformer agents, and said transformer information is determined by the one or more transformer agents.

10. A method according to claim 9, wherein the transformer agents provide meter readings to the transformer management system and/or the load management system.

11. A method according to claim 9, wherein the load management system comprises the transformer agents, and the transformer agents determine the charging information.

12. A method according to claim 11, wherein said transformer agents are adapted to determine charging information locally and autonomously.

13. A system for scheduling a charge of a plug-in electric vehicle (PEV) comprising:
   a smart meter network comprising one or more transformer agents, where each of the one or more transformer agents acquire load information from a plurality of meters in the smart meter network, each meter being associated with a given distribution transformer of a plurality of distribution transformers;
   a load management system in communication with the smart meter network;
   a transformer management system in communication with the load management system and the smart meter network for using the load information acquired from the transformer agents to develop transformer information relating to the given distribution transformer; and
   an electric vehicle supply equipment (EVSE) in communication with the load management system and the transformer management system via the smart meter network;

wherein, the load management system receives PEV information from a PEV plugged into the EVSE and receives the transformer information relating to the given distribution transformer from the transformer management system; and wherein the load management system determines charging information based on the PEV information and the transformer information of the given distribution transformer and provides the charging information to the PEV.

14. A system according to claim 13, wherein the PEV information comprises one or more of the group consisting of account information, charging plan, EVSE type, preferred charge time, power required, and charge rate.

15. A system according to claim 13, wherein the transformer information comprises one or more of the group consisting of vender/model ID, type of transformer, transformer capacity, maximum input voltage, minimum input voltage, duty, frequency range, voltage class, cooling type, magnetic form, and three phase winding configuration.

16. A system according to claim 13, wherein the charging information comprises one or more of the group consisting of charge start time, charge end time, charge duration, and charge rate.

17. A system according to claim 13, further comprising confirming, by the load management system, the PEV information.

18. A system according to claim 13, wherein the EVSE charges the PEV according to the charging information.

19. A system according to claim 13 wherein the transformer management system receives the PEV information and the charging information and updates the transformer information of the given distribution transformer based on the charging information and PEV information.

20. A system according to claim 11, wherein the load management system, the transformer management system, and the EVSE are in communication via the smart meter network.

21. A system according to claim 20, wherein the transformer information of the given distribution transformer is determined by the one or more transformer agents.

22. A system according to claim 21, wherein the transformer agents provide meter readings to the transformer management system and the transformer information is based on the meter readings.

23. A system according to claim 21, wherein the load management system comprises the transformer agents, and the transformer agents determine the charging information.

24. A system according to claim 23, wherein the transformer agents are adapted to determine charging information locally and autonomously.

* * * * *